US011694027B2

(12) United States Patent
Goel et al.

(10) Patent No.: US 11,694,027 B2
(45) Date of Patent: Jul. 4, 2023

(54) HYBRID LANGUAGE DETECTION MODEL

(71) Applicant: ServiceNow, Inc., Santa Clara, CA (US)

(72) Inventors: Ankit Goel, Hyderabad (IN); Prashant Pandey, Hyderabad (IN); Jebakumar Mathuram Santhosam Swvigaradoss, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/838,512

(22) Filed: Jun. 13, 2022

(65) Prior Publication Data

US 2022/0318498 A1 Oct. 6, 2022

Related U.S. Application Data

(63) Continuation of application No. 16/869,155, filed on May 7, 2020, now Pat. No. 11,392,768.

(51) Int. Cl.

| | |
|---|---|
| ***G06F 40/263*** | (2020.01) |
| ***G06F 40/58*** | (2020.01) |
| ***G06F 17/18*** | (2006.01) |

(52) U.S. Cl.
CPC ............ *G06F 40/263* (2020.01); *G06F 17/18* (2013.01); *G06F 40/58* (2020.01)

(58) Field of Classification Search
CPC ......... G06F 40/263; G06F 17/18; G06F 40/58
(Continued)

(56) References Cited

U.S. PATENT DOCUMENTS 4,941,084 A 7/1990 Terada et al.
5,185,860 A 2/1993 Wu
(Continued)

FOREIGN PATENT DOCUMENTS

EP 0433979 6/1991
EP 1607824 12/2005
(Continued)

OTHER PUBLICATIONS

Wikipedia, Google Translate, downloaded from https://en.wikipedia.org/wiki/Google_Translate on Mar. 11, 2020.

*Primary Examiner* — Thierry L Pham
(74) *Attorney, Agent, or Firm* — McDonnell Boehnen Hulbert & Berghoff LLP

(57) ABSTRACT

An example embodiment may involve a software application executable on computing devices of a remote network management platform containing a computational instance associated with a managed network. A text string may be received, and characters of the string may be categorized among a plurality of symbol script families. A respective likelihood of the string corresponding to each family may be determined, and a respective probability of the string being in each language of each given family may also be determined. The respective probabilities for the languages of each given family may be weighted by the likelihoods of the given family, and then weighted sums of the probabilities for each language may be computed. The maximum of the weighted sums may correspond to the language of the text string. The respective probabilities may be determined according to hybrid N-gram and word language models for each family.

20 Claims, 10 Drawing Sheets

(58) Field of Classification Search
USPC .............................................................. 704/8
See application file for complete search history.

(56) References Cited

U.S. PATENT DOCUMENTS

| | | | |
|---|---|---|---|
| 5,237,518 | A | 8/1993 | Sztipanovits et al. |
| 5,261,097 | A | 11/1993 | Saxon |
| 5,265,252 | A | 11/1993 | Rawson, III et al. |
| 5,367,685 | A | 11/1994 | Gosling |
| 5,390,297 | A | 2/1995 | Barber et al. |
| 5,442,791 | A | 8/1995 | Wrabetz et al. |
| 5,452,415 | A | 9/1995 | Hotka |
| 5,522,042 | A | 5/1996 | Fee et al. |
| 5,533,116 | A | 7/1996 | Vesterinen |
| 5,655,081 | A | 8/1997 | Bonnell et al. |
| 5,659,736 | A | 8/1997 | Hasegawa et al. |
| 5,671,412 | A | 9/1997 | Christiano |
| 5,696,701 | A | 12/1997 | Burgess et al. |
| 5,715,463 | A | 2/1998 | Merkin |
| 5,745,879 | A | 4/1998 | Wyman |
| 5,761,502 | A | 6/1998 | Jacobs |
| 5,764,913 | A | 6/1998 | Jancke et al. |
| 5,887,139 | A | 3/1999 | Madison, Jr. et al. |
| 5,909,217 | A | 6/1999 | Bereiter |
| 5,937,165 | A | 8/1999 | Schwaller et al. |
| 5,949,976 | A | 9/1999 | Chappelle |
| 5,978,594 | A | 11/1999 | Bonnell et al. |
| 6,021,437 | A | 2/2000 | Chen et al. |
| 6,041,347 | A | 3/2000 | Harsham et al. |
| 6,088,717 | A | 7/2000 | Reed et al. |
| 6,101,500 | A | 8/2000 | Lau |
| 6,128,016 | A | 10/2000 | Coelho et al. |
| 6,131,118 | A | 10/2000 | Stupek, Jr. et al. |
| 6,134,581 | A | 10/2000 | Ismael et al. |
| 6,138,122 | A | 10/2000 | Smith et al. |
| 6,148,335 | A | 11/2000 | Haggard et al. |
| 6,166,732 | A | 12/2000 | Mitchell et al. |
| 6,167,448 | A | 12/2000 | Hemphill et al. |
| 6,175,866 | B1 | 1/2001 | Holloway et al. |
| 6,175,878 | B1 | 1/2001 | Seaman et al. |
| 6,260,050 | B1 | 7/2001 | Yost et al. |
| 6,263,457 | B1 | 7/2001 | Anderson et al. |
| 6,272,150 | B1 | 8/2001 | Hrastar et al. |
| 6,336,138 | B1 | 1/2002 | Caswell et al. |
| 6,363,421 | B2 | 3/2002 | Barker et al. |
| 6,393,386 | B1 | 5/2002 | Zager et al. |
| 6,397,245 | B1 | 5/2002 | Johnson, II et al. |
| 6,434,626 | B1 | 8/2002 | Prakash et al. |
| 6,438,592 | B1 | 8/2002 | Killian |
| 6,456,306 | B1 | 9/2002 | Chin et al. |
| 6,466,932 | B1 | 10/2002 | Dennis et al. |
| 6,487,590 | B1 | 11/2002 | Foley et al. |
| 6,505,248 | B1 | 1/2003 | Casper et al. |
| 6,526,442 | B1 | 2/2003 | Stupek, Jr. et al. |
| 6,621,823 | B1 | 9/2003 | Mellquist et al. |
| 6,707,795 | B1 | 3/2004 | Noorhosseini et al. |
| 6,742,015 | B1 | 5/2004 | Bowman-Amuah |
| 6,763,380 | B1 | 7/2004 | Mayton et al. |
| 6,816,898 | B1 | 11/2004 | Scarpelli et al. |
| 6,895,586 | B1 | 5/2005 | Brasher et al. |
| 6,948,175 | B1 | 9/2005 | Fong et al. |
| 6,985,901 | B1 | 1/2006 | Sachse et al. |
| 7,003,564 | B2 | 2/2006 | Greuel et al. |
| 7,028,228 | B1 | 4/2006 | Lovy et al. |
| 7,043,537 | B1 | 5/2006 | Pratt |
| 7,043,661 | B2 | 5/2006 | Valadarsky et al. |
| 7,062,683 | B2 | 6/2006 | Warpenburg et al. |
| 7,096,459 | B2 | 8/2006 | Keller et al. |
| 7,146,574 | B2 | 12/2006 | Goldthwaite et al. |
| 7,197,466 | B1 | 3/2007 | Peterson et al. |
| 7,215,360 | B2 | 5/2007 | Gupta |
| 7,216,304 | B1 | 5/2007 | Gourdol et al. |
| 7,222,147 | B1 | 5/2007 | Black et al. |
| 7,281,170 | B2 | 10/2007 | Taylor et al. |
| 7,412,502 | B2 | 8/2008 | Fearn et al. |
| 7,505,872 | B2 | 3/2009 | Keller et al. |
| 7,593,013 | B2 | 9/2009 | Agutter et al. |
| 7,596,716 | B2 | 9/2009 | Frost et al. |
| 7,617,073 | B2 | 11/2009 | Trinon et al. |
| 7,660,731 | B2 | 2/2010 | Chaddha et al. |
| 7,676,294 | B2 | 3/2010 | Baier et al. |
| 7,676,437 | B2 | 3/2010 | Satkunanathan et al. |
| 7,840,490 | B1 | 11/2010 | Sellers et al. |
| 7,877,783 | B1 | 1/2011 | Cline et al. |
| 7,890,869 | B1 | 2/2011 | Mayer et al. |
| 7,966,398 | B2 | 6/2011 | Wiles, Jr. |
| 8,060,396 | B1 | 11/2011 | Bessler et al. |
| 8,196,210 | B2 | 6/2012 | Sterin |
| 8,321,948 | B2 | 11/2012 | Robinson et al. |
| 8,407,669 | B2 | 3/2013 | Yee et al. |
| 8,554,750 | B2 | 10/2013 | Rangarajan et al. |
| 8,595,647 | B2 | 11/2013 | Sabin et al. |
| 8,620,818 | B2 | 12/2013 | Hughes et al. |
| 8,646,093 | B2 | 2/2014 | Myers et al. |
| 8,674,992 | B2 | 3/2014 | Poston et al. |
| 8,725,647 | B2 | 5/2014 | Disciascio et al. |
| 9,201,870 | B2 | 12/2015 | Jurach, Jr. |
| 2002/0116340 | A1 | 8/2002 | Hellberg et al. |
| 2002/0133584 | A1 | 9/2002 | Greuel et al. |
| 2002/0158969 | A1 | 10/2002 | Gupta |
| 2003/0118087 | A1 | 6/2003 | Goldthwaite et al. |
| 2003/0200293 | A1 | 10/2003 | Fearn et al. |
| 2005/0015217 | A1 | 1/2005 | Weidl et al. |
| 2005/0091356 | A1 | 4/2005 | Izzo |
| 2006/0026453 | A1 | 2/2006 | Frost et al. |
| 2006/0095461 | A1 | 5/2006 | Raymond |
| 2006/0179058 | A1 | 8/2006 | Bram et al. |
| 2006/0293942 | A1 | 12/2006 | Chaddha et al. |
| 2007/0033279 | A1 | 2/2007 | Battat et al. |
| 2007/0188494 | A1 | 8/2007 | Agutter et al. |
| 2007/0288389 | A1 | 12/2007 | Vaughan et al. |
| 2008/0133289 | A1 | 6/2008 | Armour et al. |
| 2008/0148253 | A1 | 6/2008 | Badwe et al. |
| 2008/0319779 | A1 | 12/2008 | Hughes et al. |
| 2009/0088875 | A1 | 4/2009 | Baier et al. |
| 2009/0228984 | A1 | 9/2009 | Sterin |
| 2009/0281790 | A1 | 11/2009 | Travieso |
| 2010/0110932 | A1 | 5/2010 | Doran et al. |

FOREIGN PATENT DOCUMENTS

| | | | |
|---|---|---|---|
| WO | WO 99/34285 | 7/1999 | |
| WO | WO 00/52559 | 9/2000 | |
| WO | WO 01/79970 | 10/2001 | |
| WO | WO-2016060687 A1 * | 4/2016 | G06F 40/263 |

* cited by examiner

HYBRID LANGUAGE DETECTION MODEL

CROSS-REFERENCE TO RELATED APPLICATIONS

This application is a continuation of U.S. patent application Ser. No. 16/869,155, filed May 7, 2020, which is incorporated herein by reference in its entirety.

BACKGROUND

A remote network management platform may take the form of a hosted environment that provides application Platform-as-a-Service (aPaaS) services to users, particularly to operators of a managed network such as enterprises. Such services may take the form of web-based portals and/or software applications that enterprises, and both internal and external users thereof, may access through computational instances of the remote network management platform.

Many services and interfaces that a remote network management platform provides can be database-driven. That is, such services and interfaces can involve the remote network management platform retrieving data for users, often in response to user queries. Thus, the efficiency in which the remote network management platform retrieves and otherwise manages its data can impact the effectiveness of such services and interfaces.

SUMMARY

A large enterprise or organization may have offices and/or operations in numerous countries. A managed network for such an enterprise or organization may serve the needs of and/or provide support for personnel and/or users in many countries, and consequently may involve and/or require communications and transactions in many spoken and written human languages. In managed networks that support communications and/or other functions or operations that involve information transmission or exchange in multiple human languages, it may be desirable or necessary to be able to identify the language in which various written communications or the like are originated and/or received. In particular, proper, appropriate, and/or best handling or processing of written communications may involve identification or detection of the language of the written communication.

Accordingly, a first example embodiment may involve a system comprising: a remote network management platform associated with a managed network and containing a computational instance. The system may also include a software application that is executable on a one or more computing devices of the system, and is configured to cause the one or more computing devices to: receive, from a client device, a text string comprising a sequence of characters, each having a respective Unicode value; categorize each character of the sequence as belonging to one of a plurality of symbol script families based on a comparison of the character's respective Unicode value with predetermined Unicode value ranges respectively associated with the symbol script families of the plurality; determine a respective character count for each given symbol script family of the plurality according to how many characters of the sequence are categorized as belonging to the given symbol script family; for each respective symbol script family of the plurality, calculate a first likelihood that the text string corresponds to a language belonging to the respective symbol script family according to a ratio of the character count for the given symbol script family to a total character count of characters in the sequence of characters; for each particular symbol script family of all of any of the plurality that (i) has a non-zero first likelihood, and (ii) has only one language belonging to it, determine that a respective first probability of the text string being in the one language is equal to the first likelihood for the particular symbol script family; for each given symbol script family of all of any of the plurality that (i) has a non-zero first likelihood, and (ii) has a multiplicity of languages belonging to it: (a) apply a predetermined language model for the given symbol script family to the text string to determine for each respective language of the multiplicity a respective second likelihood that the text string corresponds to the respective language, and (b) multiply each respective second likelihood by the first likelihood for the given symbol script family to determine for each respective language of the multiplicity a respective second probability that text string is in the respective language; if there is at least one of (i) at least one particular symbol script family, or (ii) at least one given symbol script family, then: for each given language that is a member of at least one of (a) the at least one particular symbol script family, or (b) the at least one given symbol script family, compute a respective sum of all of any respective first and second probabilities determined for the given language, and mark the language of the text string to be the one from among the given languages for which the sum is maximum; if there are no particular symbol script families and no given symbol script families, then mark the language of text string to be unknown; and send to the client device an indication that the text string is in the marked language.

A second example embodiment may involve a method performed by a software application executable on one or more computing devices of a system comprising a remote network management platform associated with a managed network and containing a computational instance. The method may include: receiving, from a client device, a text string comprising a sequence of characters, each having a respective Unicode value; categorizing each character of the sequence as belonging to one of a plurality of symbol script families based on a comparison of the character's respective Unicode value with predetermined Unicode value ranges respectively associated with the symbol script families of the plurality; determining a respective character count for each given symbol script family of the plurality according to how many characters of the sequence are categorized as belonging to the given symbol script family; for each respective symbol script family of the plurality, calculating a first likelihood that the text string corresponds to a language belonging to the respective symbol script family according to a ratio of the character count for the given symbol script family to a total character count of characters in the sequence of characters; for each particular symbol script family of all of any of the plurality that (i) has a non-zero first likelihood, and (ii) has only one language belonging to it, determining that a respective first probability of the text string being in the one language is equal to the first likelihood for the particular symbol script family; for each given symbol script family of all of any of the plurality that (i) has a non-zero first likelihood, and (ii) has a multiplicity of languages belonging to it: (a) applying a predetermined language model for the given symbol script family to the text string to determine for each respective language of the multiplicity a respective second likelihood that the text string corresponds to the respective language, and (b) multiplying each respective second likelihood by the first likelihood for the given symbol script family to determine for each respective language of the multiplicity a respective second probability that text string is in the respective language; if there is at least one of (i) at least one particular symbol script family, or (ii) at least one given symbol script family, then: for each given language that is a member of at least one of (a) the at least one particular symbol script family, or (b) the at least one given symbol script family, computing a respective sum of all of any respective first and second probabilities determined for the given language, and marking the language of the text string to be the one from among the given languages for which the sum is maximum; if there are no particular symbol script families and no given symbol script families, then marking the language of text string to be unknown; and sending to the client device an indication that the text string is in the marked language.

In a third example embodiment, article of manufacture may include a non-transitory computer-readable medium, having stored thereon program instructions that, upon execution by one or more computing devices of a system comprising a remote network management platform associated with a managed network and containing a computational instance, cause the system to perform a set of operations. The set of operations may include: receiving, from a client device, a text string comprising a sequence of characters, each having a respective Unicode value; categorizing each character of the sequence as belonging to one of a plurality of symbol script families based on a comparison of the character's respective Unicode value with predetermined Unicode value ranges respectively associated with the symbol script families of the plurality; determining a respective character count for each given symbol script family of the plurality according to how many characters of the sequence are categorized as belonging to the given symbol script family; for each respective symbol script family of the plurality, calculating a first likelihood that the text string corresponds to a language belonging to the respective symbol script family according to a ratio of the character count for the given symbol script family to a total character count of characters in the sequence of characters; for each particular symbol script family of all of any of the plurality that (i) has a non-zero first likelihood, and (ii) has only one language belonging to it, determining that a respective first probability of the text string being in the one language is equal to the first likelihood for the particular symbol script family; for each given symbol script family of all of any of the plurality that (i) has a non-zero first likelihood, and (ii) has a multiplicity of languages belonging to it: (a) applying a predetermined language model for the given symbol script family to the text string to determine for each respective language of the multiplicity a respective second likelihood that the text string corresponds to the respective language, and (b) multiplying each respective second likelihood by the first likelihood for the given symbol script family to determine for each respective language of the multiplicity a respective second probability that text string is in the respective language; if there is at least one of (i) at least one particular symbol script family, or (ii) at least one given symbol script family, then: for each given language that is a member of at least one of (a) the at least one particular symbol script family, or (b) the at least one given symbol script family, computing a respective sum of all of any respective first and second probabilities determined for the given language, and marking the language of the text string to be the one from among the given languages for which the sum is maximum; if there are no particular symbol script families and no given symbol script families, then marking the language of text string to be unknown; and sending to the client device an indication that the text string is in the marked language.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
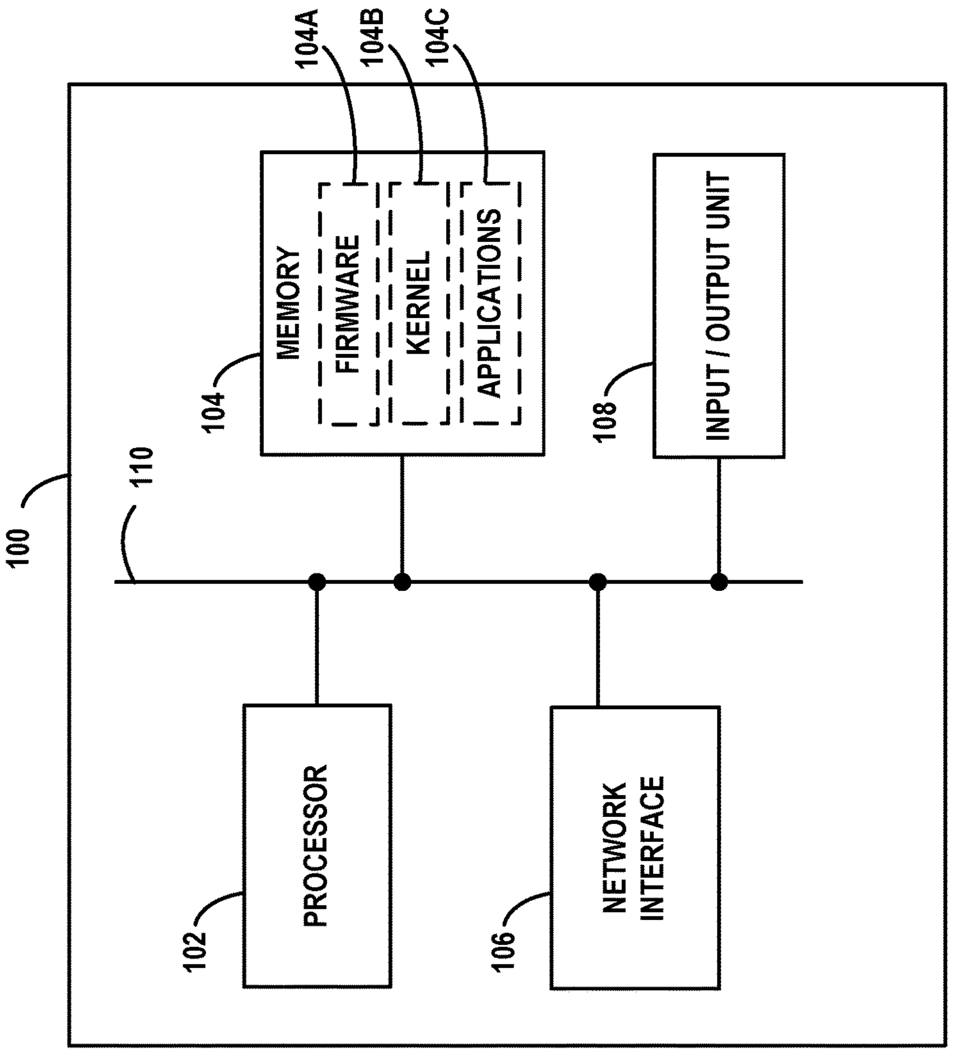
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
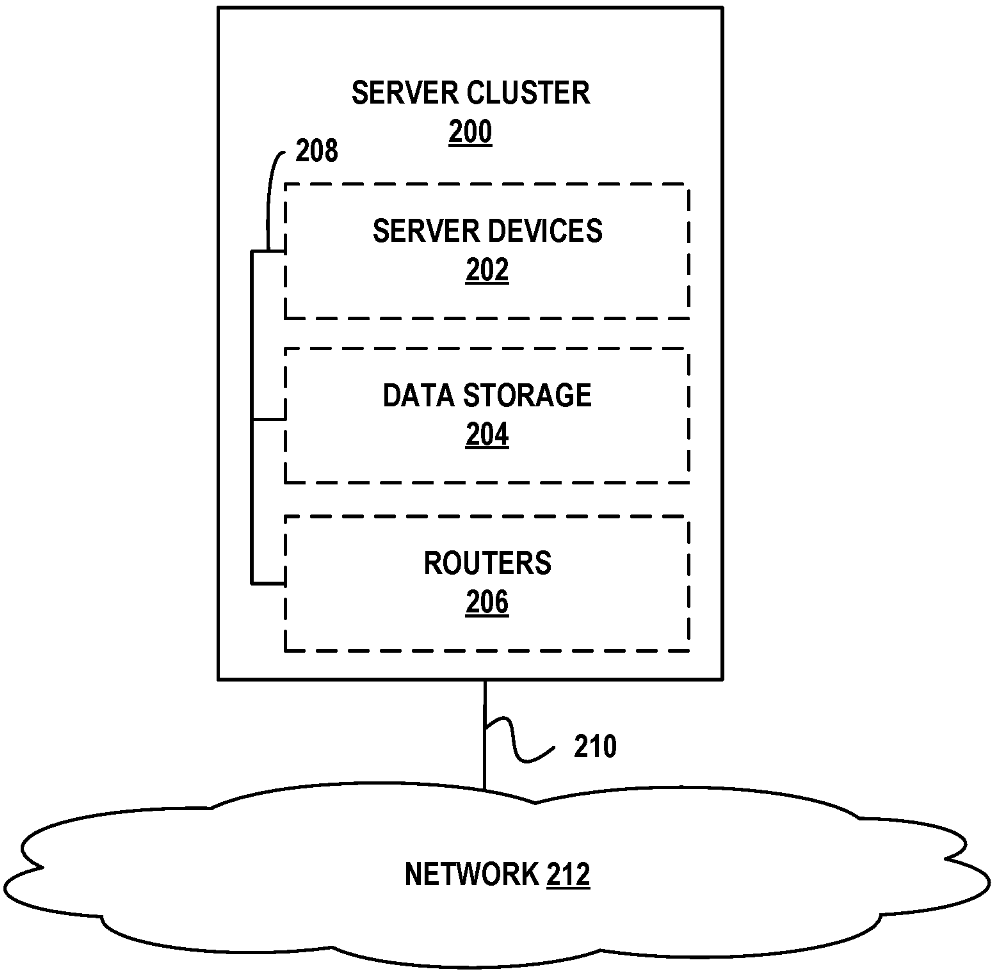
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
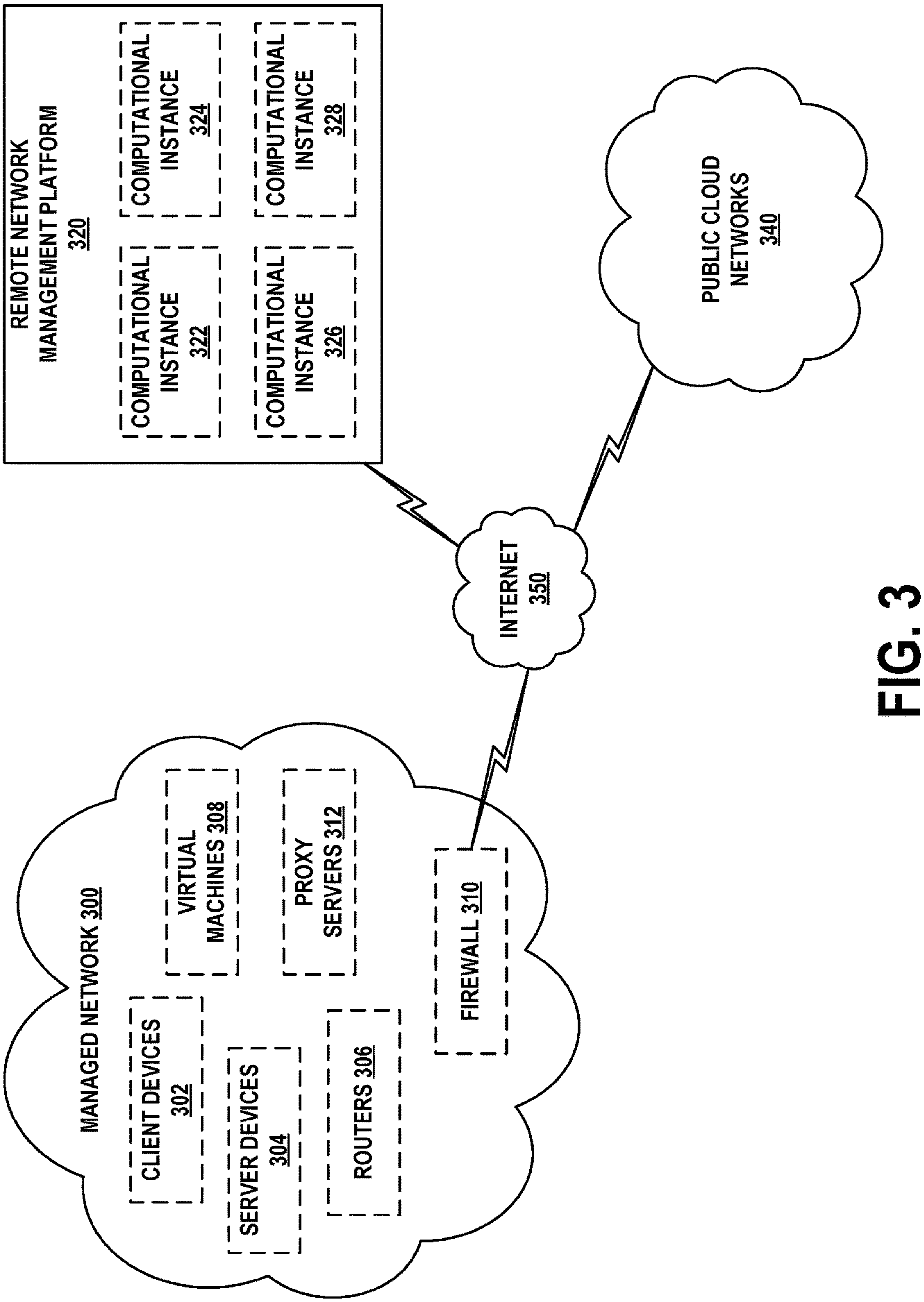
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall

310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
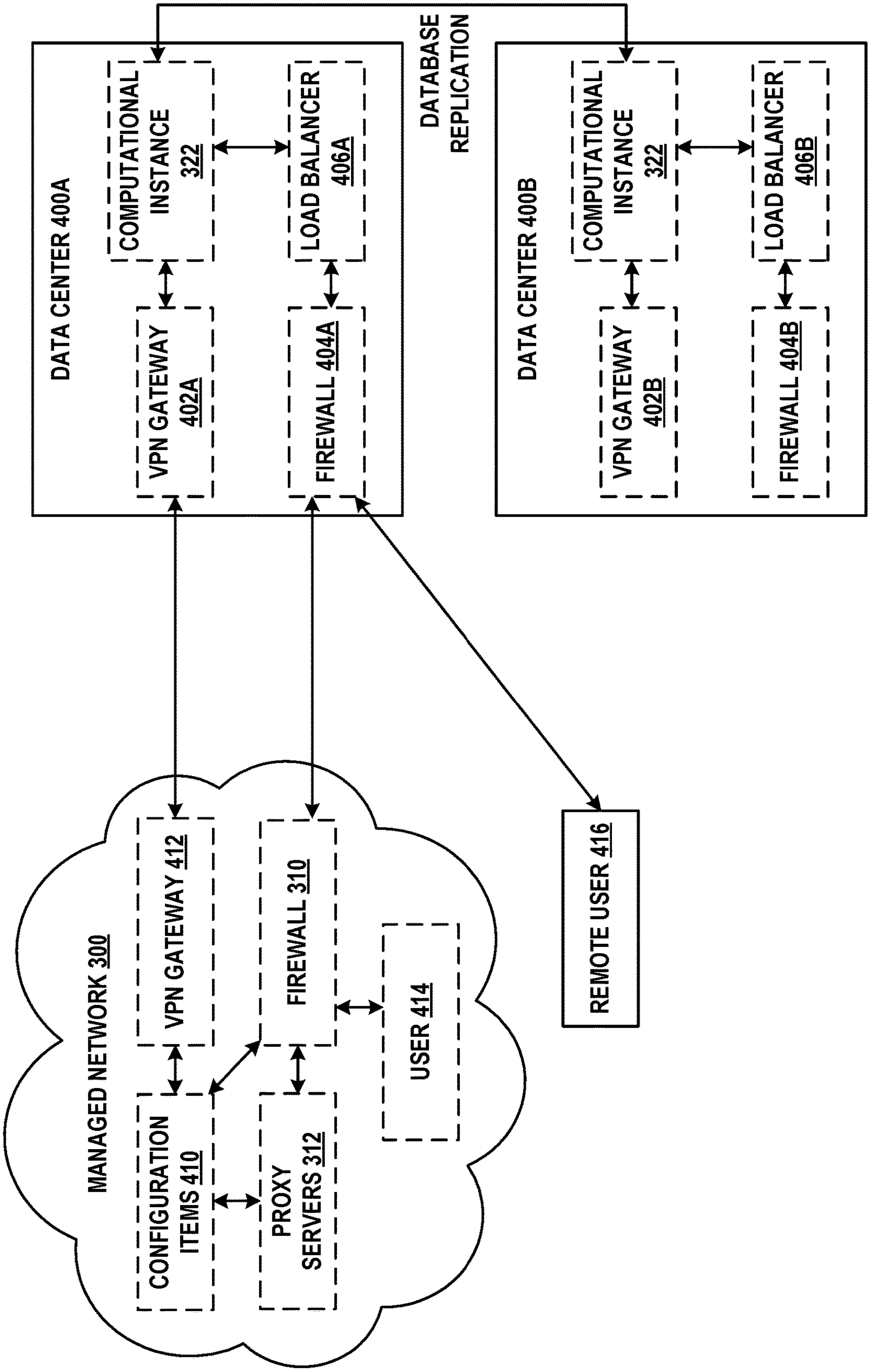
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
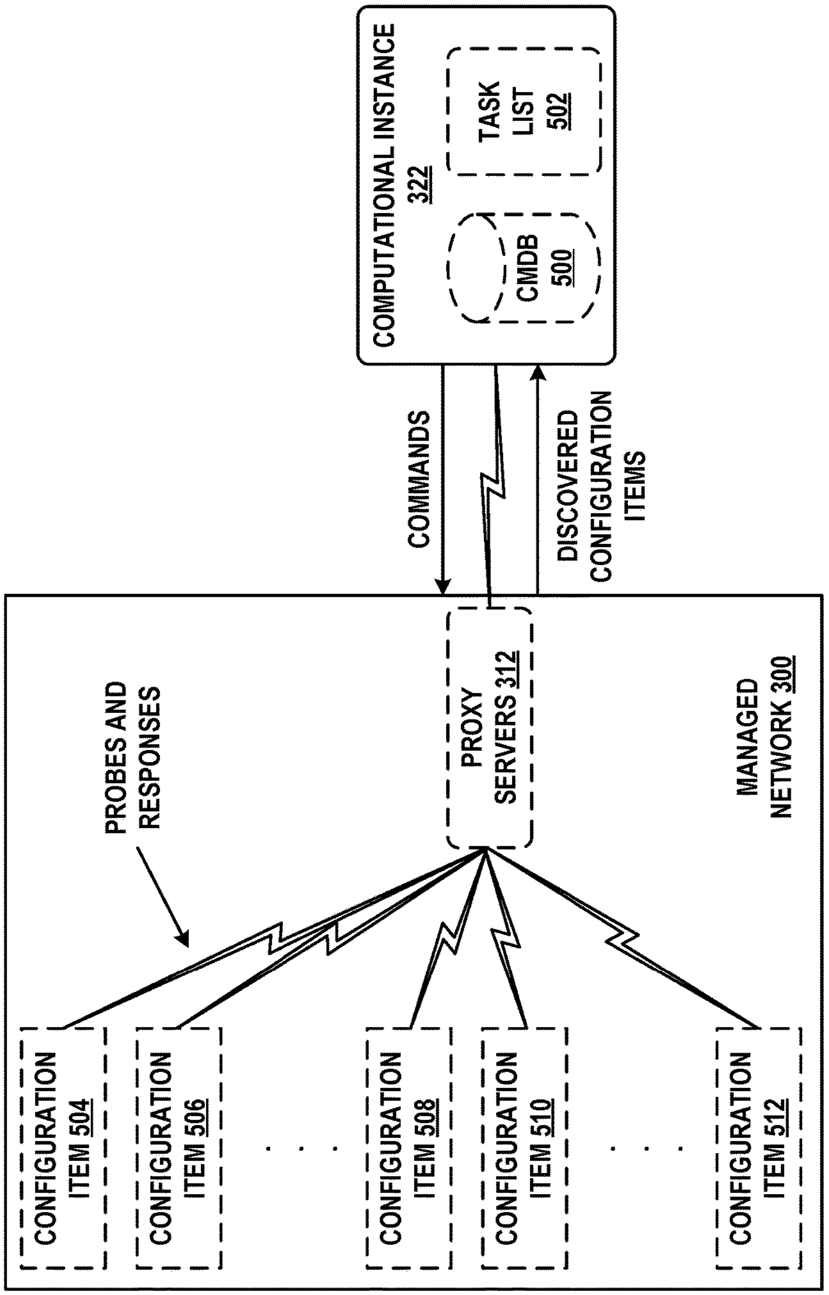
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
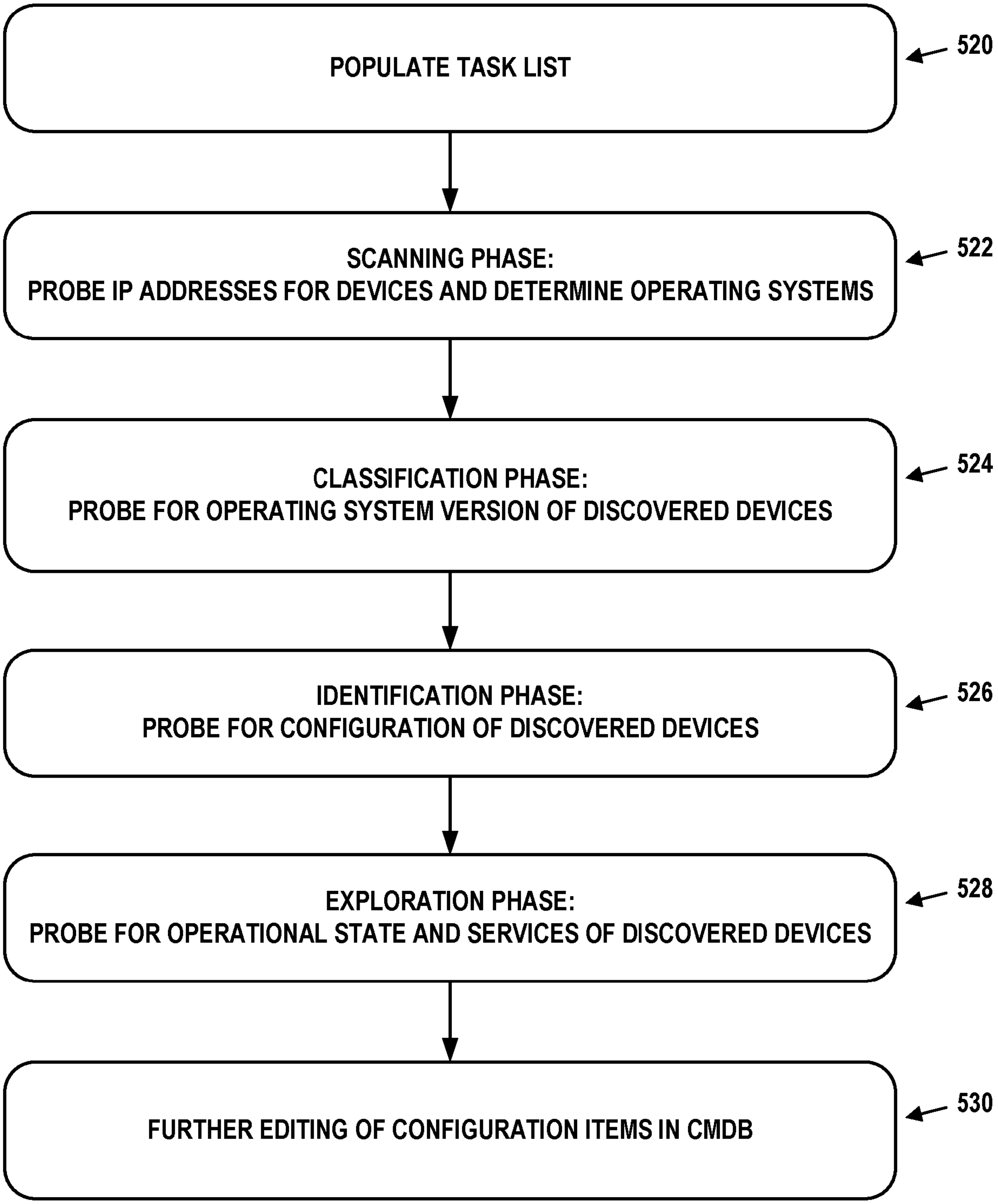
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms.

As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Systems and Methods of Language Detection Using Hybrid Language Detection Models A large enterprise or organization may have offices and/or operations in numerous countries. This may be particularly true, for example for an international enterprise or organization. A managed network for such an enterprise or organization may serve the needs of and/or provide support for personnel and/or users in many countries, and consequently may involve and/or require communications and transactions in many spoken and written human languages. It should be understood that there could be other operational and/or mission-related aspects of an enterprise or organization, besides international presence or locations, for example, which might involve or require communications and transactions in many spoken and written human languages. In managed networks that support communications and/or other functions or operations that involve information transmission or exchange in multiple human languages, it may be desirable or necessary to be able to identify the language in which various written communications or the like are originated and/or received. In particular, proper, appropriate, and/or best handling or processing of written communications may involve identification or detection of the language of the written communication.

The following example scenario illustrates a situation in which identification of the language of a communication could be necessary or desirable. Customer-service-level IT support (e.g., "Help desk") staff may receive a request for network support help from an end user. The request may be related to a network problem, such as email issues, connectivity issues, or database access issues, for example. In servicing the end user's request, the IT staff may become aware of a problem that requires sending a written technical problem description and query to a network infrastructure support team that handles problems and issues for multiple sites and/or locations of the managed network that may conduct their local communications in different respective languages. Thus, the support team may conduct operations in one language, for example, English. However, the IT query may originate from an IT Help desk that serves end users in another language, such as French, Arabic, or Korean, for example. As such, the written description may be composed and received in a different language than English (for this example). The support team may therefore need to translate the IT query into English, for example by using a machine-learning (ML) translator. But to do this, the language in which the IT query was written and received may first need to be identified in order to determine an appropriate ML translator. This is just one example of many possible scenarios and situations in which the language of a text document, message, or other written communication needs to be determined. Other examples could include processing written text with a text-to-speech (TTS) system, in which case the language of the input text may need to be determined in order to select an appropriate output language for the TTS system.

In accordance with example embodiments, a system for identification and/or detection of the language in which text documents, messages, communications, or the like are written may include one or more computing devices or servers configured for executing a software application that implements a hybrid language detection model. Computing device 100 and server cluster 200 are non-limiting examples of devices and systems in which a hybrid language detection model system could be implemented. A software application that implements a hybrid language detection model may, in turn, include software instructions, for example, that carry out various methods, procedures, and/or algorithms as described herein for processing input text, analyzing the text characters contained or included therein, and applying one or more analytical models in order to identify or detect the language in which the input text is written. The software application may also carry out various ancillary operations, such as training one or more component detection models, and returning or sending results of detection to an entity requesting detection and/or to an entity for further processing of the input text, for example.

Written text typically takes the form of one or more sequences of text characters, each character being a symbol, such as a letter or number, of a written language. The types and information content of the symbols of different languages may differ for different languages. For example, written English and Spanish use Latin letters, while written Chinese and Japanese use logograms that can each represent extended content, such as word or phrases. Written language symbols are typically categorized or classified according to symbol "script" families, and each symbol script family may include one or more languages. For example, the Latin symbol script family includes, in addition to English and Spanish, French, Italian, and Finnish, among others. The CJK symbol script family includes Chinese, Japanese, and Korean, and the Cyrillic symbol script family includes Bulgarian, Russian, and Ukrainian. Other symbol script families contain just one language, such as Thai, which includes only the Thai language, and the Hangul symbol script family includes only Korean. Note Korean is an example of a language that belongs to more than one symbol script family.

For purposes of the illustration of example embodiments herein, an example list of 11 symbol script families will be considered in the present disclosure, namely, Latin, Cyrillic, Arabic, CJK, Greek, Thai, Hebrew, Hiragana, Kana, Katakana, and Hangul. It should be understood that there can be other symbol script families, and that this example list is not intended to be limiting with respect to the example embodiments and/or principles and procedures discussed herein.

In general, a written text communication, such as might be sent and/or received in the example situation for network communications described above, may include more than language of a symbol script family. This could be the case, for example, when multiple languages of a symbol script family share the same word, or when a phrase in one language finds common usage in another. There could also be instances in which a written text includes characters from more than one symbol script family. Thus, the task of identifying the language of a written text communication may entail determining which language among possibly multiple symbol script families represented in the written text is, or is most likely to be, the intended language of the written communication.

The use of "intended language" herein may be considered to describe one or more possible reasons for "intent," including both explicit or express intent and implicit intent of the creator or originator of the written communication. The use herein of "intended language" also enables describing a text string or other communication as being "in" a particular language, while at the same time including words and/or symbols of other languages. This could be the case, for example if a text string in English includes a French word that has come to common usage in English.

In accordance with example embodiments, the language of a written communication may be determined by applying to the written communication an analytical model trained to recognize text in multiple languages. The result of the analysis may then be an identification of the most likely language from among the multiple languages. The result may also include a statistical metric, such as a confidence, of the identification being correct. Additionally or alternatively, the result could be a ranking among the multiple languages, where the rankings correspond to likelihoods and/or confidences of the respective identifications as being the language of the written communication.

For purposes of illustration and convenience in the present discussion, the term "text string" will generally be taken to represent any written communication for which a language determination or identification is sought, required, or desired. As such, a text string as referred to herein could be a short written phrase or sentence, or a larger written document. Other forms are possible as well. If the term "text string" is intended to have more restricted or specific meaning, such as a short phrase, this meaning will be made clear in the relevant context.

The inventors have recognized that analytical models for language identification may be constructed based on various forms of language substructures in a text string. Specifically, a model may be trained to recognize or identify specific examples of various languages based on typical or common structural patterns of each language, as represented in, for example, a corpus of training data. Trained models may then be used to analyze text strings for which no prior language determination has been made, in order to identify or detect the language of the text string.

Non-limiting examples of substructures include words and N-grams, as well as identification of one or more symbol script families of the characters in a text string. For word models, a text string may be analyzed for the occurrence and ordering of the words contained. Similarly, for N-gram models, a text string may be analyzed for the occurrence and ordering of the words contained. In the present discussion an N-gram is a grouping of N consecutive characters in a text string, where N is a positive integer. All possible N-gram combinations of a text string can be determined by applying the N-gram as a sort of sliding window of N consecutive characters across the text string, advancing the N-gram one character at a time. Note that a text string needs to have at least N characters to have at least one N-gram substructure.

The inventors have discovered that different languages tend to be characterized by different substructures, and for some languages a mix of substructure types may provide a better characterization than just one type. Specifically, and in accordance with example embodiments, models may be constructed for different languages based on particular, possibly different, mixes of N-grams models and word models, where the particular mixes may be empirically determined to produce the best or optimal results during model training with training data for each language. The mixed models are referred to herein as "hybrid" language models. Note that the term "hybrid" applies to the types and variety of substructures used, not to a language that is itself some sort of hybrid.

A hybrid model may include a mix of a word model with an N-gram model for just one value of N, a mix of a word model with two or more N-gram models, each having a different value of N, or a mix of only N-gram models, each having a different value of N. Some languages may be optimally or best (in a probabilistic sense) modeled by a word model alone, or by a single N-gram model for value of N. As noted above, a language that is the only family member of a given symbol script family needs only to be determined to belong to the given symbol script family in order to be identified.

In accordance with example embodiments, and as described below in more detail, a "mix" or hybrid of models may be constructed as a weighted sum of models, where the weighting may be determined empirically for each language. Weighting determination may involve testing different single-model components on a given language, and ranking the results by a score or other probability metric. Components yielding scores above a threshold may then be selected for mixing in the hybrid model. The scores of the selected components may then be used as weighting factors. Specifically, when applying the hybrid model to a text string for which no prior language determination has been made, the model component results may be summed according to the respective model weights. The sum may also be normalized to the sum of the weights.

The inventors have further discovered that multiple languages belonging to the same symbol script family all tend to be well modeled by similar hybrid mixes of model components, with similar weighting factors. For example, as discussed below, a trained hybrid word and 5-gram model provides good predicted language identification of languages belonging to the Latin symbol script family. Similarly, as also discussed below, a trained hybrid 1-gram and 2-gram model provides good predicted language identification of languages belonging to the CJK symbol script family. Accordingly, identification of the symbol script families represented in a text string may be used determine which particular hybrid model components and weights should be used for analyzing the language of the text string.

In accordance with example embodiments, analytical models for language recognition may therefore also include identification of one or more symbol script families to which a text string or sub-portions of a text string belongs. As described below, this identification may be made deterministically for particular forms of digital representation of text. Once a text string or portion thereof is identified as belonging to a given symbol script family, the language of the text string or portion thereof may be identified directly if the given family has only one member language, or may be identified according to a word model, an N-gram model, or as described below, by a mixed or hybrid model if the given family has more than one member language.

A. Model Component Development and Hybrid Model Construction

In accordance with example embodiments, a hybrid language detection model may be implemented by developing model components trained for predictive identification of specific languages, and then determining weighting factors for constructing a hybrid mix of the trained models for run-time prediction. More specifically, model development may involve training particular model components for each language, and then determining empirically weighting factors to apply to the components for combining them in hybrid models. As noted above and further described below, the inventors have discovered that a respective hybrid model may be constructed in this way for some or all the languages of each multi-language symbol script family. In general, some model components may work not well or at all for all symbol script families. For example, CJK languages do not have the concept of words, so a word model is not applicable. However all languages have the concept of characters, so N-grams models may be appropriate for all languages. Still, the best value or values of N may need to be determined empirically.

In practice, written text can represented as digital data in the form of one or more sequences of numerical codes, each numerical code being uniquely assigned to a specific character of a specific language. Various coding schemes are known and used. Non-limiting examples include the American Standard Code for Information Interchange (ASCII) and Unicode. Example embodiments herein will be described in terms of, and utilizing, Unicode. It should be understood, however, that this is not intended to limit the scope of possible embodiments, and that other character coding schemes may be used.

In a Unicode scheme, symbol script families are associated with, or assigned, specific ranges of Unicode values. The example list of 11 symbol script families considered in the present disclosure and their respective Unicode value ranges in hexadecimal are shown in Table 1. The example list is not necessarily a complete list of all known symbol scripts.

TABLE 1

| Symbol Script Family | Unicode Range |
|---|---|
| Latin | 0000-007F |
| Cyrillic | 0400-04FF |
| Arabic | 0600-06FF |
| CJK | 3000-303F |
| Greek | 0370-03FF |
| Thai | 0E00-0E7F |
| Hebrew | 0590-05FF |
| Hiragana | 3040-309F |
| Kana | 31F0-31FF |
| Katakana | 30A0-30FF |
| Hangul | 1100-11FF |

Within each of the Latin, Cyrillic, Arabic, and CJK symbol script families, there are multiple languages. A partial listing, by way of example, of Latin languages includes Czech, Dutch, Finnish, French, German, Hungarian, Italian, Polish, Portuguese, Spanish, English, Catalan, Danish, Indonesian, Norwegian, Swedish, Turkish, Romanian, and Vietnamese. Cyrillic languages include Bulgarian, Russian, and Ukrainian. The Arabic symbol script family includes the Arabic and Persian languages. CJK includes Chinese, Japanese, and Korean. The remaining seven symbol script families each include just one language. Namely, the Greek symbol script family includes the Greek language; the Thai symbol script family includes the Thai language; the Hebrew symbol script family includes the Hebrew language; the Hiragana symbol script family includes the Japanese language; the Kana symbol script family includes the Japanese language; the Katakana symbol script family includes the Japanese language; and the Hangul symbol script family includes the Korean language. Example hybrid language models described herein will take these symbol script families and the respective languages as examples. It should be understood that the principles and techniques described are not limited to just these symbol script families and languages.

Figure 6:
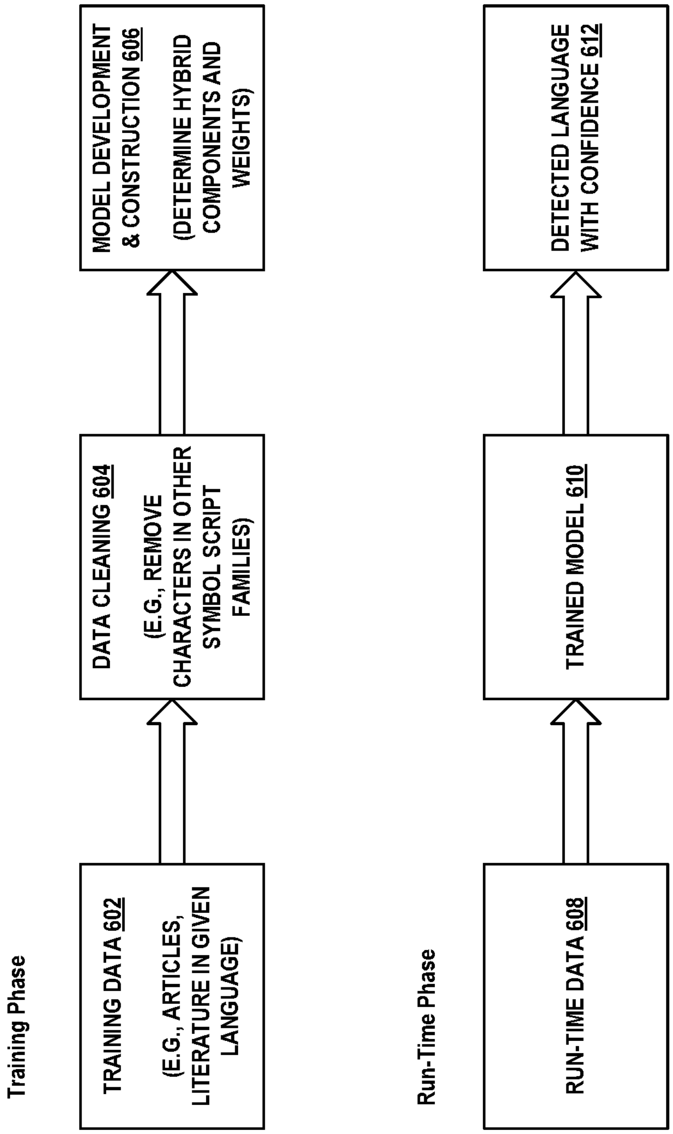
FIG. 6 depicts a high-level process flow diagram, in accordance with example embodiments.

FIG. 6 depicts a high-level process flow diagram, in accordance with example embodiments. The example process flow may involve a training phase, in which a language model is trained to be able to probabilistically identify specific languages from training data containing text in known languages; and a run-time phase, in which a trained model may be applied to run-time text strings for which language identifications have not yet been made or are otherwise unknown, in order to probabilistically identify the respective languages of the run-time text strings.

During the training phase, training data 602, made up of text samples known and/or arranged a priori to be in a particular language of a particular symbol script family, are first subject to data "cleaning" 604 to remove text characters that do not belong to the particular symbol script family. This is followed by model development and construction 606, in which the cleaned training data for each given language are analyzed using one or more components of a hybrid language detection model to determine parameters of each component that yield the best probabilistic identifications for the given language. The results of all of the trained components for the languages of each symbol script family are evaluated to determine weighting factors for each component such that a weighted average of the results yield the best final results. It may be noted that best hybrid model for a given symbol script family may not necessarily include all possible model components. For example, an example hybrid model for the CJK family will not general include a word model component. Further, a symbol script family containing only one language does not need any model components other than one for identifying membership in the family, since identification of the family amounts to identification of the single member language.

In accordance with example embodiments, the training data 602 may include magazine articles, technical documents, sentences, phrases, and other forms of written text represented digitally in Unicode (or digital coding schemes). The training data 602 may represent samples of written text known a priori to be completely or predominantly in particular languages. Each sample may be tagged or labeled according to its particular language. However, any given sample could include more than one language and/or more than one symbol script family. The data cleaning 604 may thus remove characters of all but one symbol script family, leaving one or more languages of the one remaining family.

Once the model component parameters and component weights have been determined from training and model development, the trained model may be applied in the run-time phase to run-time text strings. As indicated in FIG. 6, run-time data 608 are presented or input to the trained model 610, which yields one or more probabilistically identified languages 612, together (possibly) with statistical confidences of the identification(s). The result may then be used in a subsequent operation, such as TTS generation or ML language translation.

Data Cleaning During Training.

In accordance with example embodiments, during training, data cleaning 604 of a training text string labeled as being in a particular language may involve removing characters belonging to symbol script families other than that of the particular family. This may be done based on the Unicode values of the characters in the text string. By way of example, the text string may be labeled as being in the Thai language, and may contain the following sequence of characters:

สวัสดีชาวโลก thai language ภาษา

From Table 1, it can be seen that the Thai symbol script family includes Unicode values 0E00-0E7F. Removing all characters that are not in this range yields the "cleaned" text string:

สวัสดีชาว โลก ภาษา

Thus, only Thai characters remain in these particular training data.

Symbol Script Family Model.

In accordance with example embodiments, a model or model component based on determination of symbol script families represented in a text string may be used for determining a probability of a text string being in a language of a particular symbol script family. This model may be implemented by categorizing the characters of an input text string according to the symbol script families to which they belong. For example, Unicode ranges of all symbol script families may be stored respective key-value pairs, with each pair including a Unicode range as a key and a symbol script family as its value. An input text string may then be analyzed according to the symbol script family detection model and each character of the text string identified and categorized according to symbol script family.

A probability of the text string belonging to each of one or more symbol script families may then be computed as shown in equation (1):

$$P(\text{text} \in \text{symbol script family}) = \frac{\text{Number of characters belonging to symbol script family}}{\text{Total number of characters in text string}}. \quad (1)$$

Taking the above text string, "สวัสดีชาวโลก thai language ภาษา," as an example, an example symbol script model could yield the result that P(Thai)=0.6, and P(Latin)=0.4. Note that the probability for the Thai symbol script family is also the probability for the Thai language, since it is the only language of the symbol script family. However, the probability for the Latin symbol script family does not by itself distinguish among the multiple languages of the Latin symbol script family.

In accordance with example embodiments, determination of the probability of a text string being in each of one or more languages of one or more symbol script families may be calculated using word and or N-gram models.

Word Model.

In accordance with example embodiments, a word model for language identification may developed by storing probabilities of words belonging to particular languages with respect to other languages. This may be done with a corpus of training data to build a word probability model. Then, during run-time, the probabilities for each word of a run-time text string may be determined from the word probability model, and a score for the text string may be calculated as a probability-weighted sum. A word model may only be possible or appropriate for languages that have the concept of words.

An example algorithm for a word model development is described below. While it may be possible to apply the algorithm to all languages having the concept of words, in practice better results may be obtained by develop a separate word model for each symbol script family having the concept of words. The example algorithm is illustrated in Table 2.

TABLE 2

For each language having concept of words in a given symbol script family:
- Split the training data into words.
- Compute the frequency of each word in the training data. The frequency of a given word corresponds to the number of occurrences of the given word in the training data.
- Sort the words in decreasing order of frequency.
- As an optional operation, only those words which contribute to 90% of sum of frequency of all words may be considered. The effect is to omit words in a distribution "tail" making up only 10% of the training data.
- Convert the frequency of the word belonging to each given language A into probability according to equation (2):

$$P(\text{word occuring in language } A) = \frac{\text{Frequency of word occuring in language } A}{\text{Sum of frequency of all words}}. \quad (2)$$

For each word, find the probability of occurrence of that word in each given language A with respect to all languages of the given symbol script family in which that word occurs, according to equation (3):

$$P(\text{word} \in \text{language } A) = \frac{P(\text{word occuring in language } A)}{\sum P(\text{word occuring in language}) \text{ for all languages}}. \quad (3)$$

The probabilities for equation (3) for all words in the training data, except possibly to 10% tail, may be stored and consulted at run-time. An example algorithm for run-time operation of the word model is illustrated in Table 3.

TABLE 3

Input a run-time text string to the word model.
Split the text string into words.
For each given word in the input text string, do the following:
  Calculate the frequency of the given word in input text string.
  Determine the probability of the given word in all languages of the given symbol script family from the stored results of the word probability model; these are the results of equation (3).
For each language A of the given symbol script family, calculate a score for the text string being in language A according to equation (4):
Score(text ∈ language A) = Σ P(word ∈ language A) * Frequency(Word) for all words. (4)
Note that sum in equation (4) is computed over all of the words in text string.
Calculate a confidence of for each given language A normalized to the sum of the score for all of the languages in the symbol script family, according to equation (5):

$$\text{Confidence}(\text{text} \in \text{language } A) = \frac{\text{Score}(\text{text} \in \text{language } A)}{\sum \text{Score}(\text{text} \in \text{language}) \text{ for all languages}}. \quad (5)$$

An example implementation of the word model applied to the single-work text string "fiancée" gives the following results: P(French)=0.8 and P(English)=0.2.

Since the word model may not be applicable to languages that do not have the concept of words, such as Chinese and Japanese, a similar approach may be implement for N-grams instead of words.

N-Gram Model.

In accordance with example embodiments, an N-gram model for language identification may developed by storing probabilities of N-grams belonging to particular languages with respect to other languages. This may be done with a corpus of training data to build an N-gram probability model. Then, during run-time, the probabilities for each N-gram of a run-time text string may be determined from the N-gram probability model, and a score for the text string may be calculated as a probability-weighted sum.

As noted above, an N-gram is a grouping of N consecutive characters in a text string, where N is a positive integer. All possible N-gram combinations of a text string can be determined by applying the N-gram as a sort of sliding window of N consecutive characters across the text string, advancing the N-gram one character at a time. For example, all 1-grams of the text string "rabbit or duck" would be r, a, b, b, i, t, _, o, r, _, d, u, c, k. All 2-grams would be ra, ab, bb, bi, it, t_, _o, or, r_, _d, du, uc, ck. And all 3-grams would be rab, abb, bbi, bit, it_, _or, or_, r_d, _du, duc, uck. In these examples an underline character ("_") represents a white space.

An example algorithm for an N-gram model development is described below While it may be possible to apply the algorithm to all languages, in practice better results may be obtained by develop a separate N-gram model for each symbol script family. The example algorithm is illustrated in Table 4.

TABLE 4

Choose an appropriate value of N.
  For each language A of a given symbol script family, do the following:
  Split the training data into N-grams.
  Compute the frequency of each N-gram in the training data. The frequency of a given N-gram corresponds to the number of occurrences of the given N-gram in the training data.
  Sort the N-grams in decreasing order of frequency
  As an optional operation, only those N-grams which contribute to 90% of sum of frequency of all N-grams may be considered. The effect is to omit N-grams in a distribution "tail" making up only 10% of the training data.
  Convert the frequency of the N-gram belonging to each given language A into probability according to equation (6):

$$P(N\text{-gram occuring in language } A) = \frac{\text{Frequency of } N\text{-gram occuring in language}}{\text{Sum of frequency of all } N\text{-grams}} \quad (6)$$

For each N-gram, find the probability of occurrence of that N-gram in each given language A with respect to all languages of the given symbol script family in which that N-gram occurs, according to equation (7):

$$P(N\text{-gram} \in \text{language } A) = \frac{P(N\text{-gram occuring in language } A)}{\sum P(N\text{-gram occuring in language}) \text{ for all languages}} \quad (7)$$

The probabilities for equation (7) for all N-grams in the training data, except possibly to 10% tail, may be stored and consulted at run-time. An example algorithm for run-time operation of the N-gram model is illustrated in Table 5.

TABLE 5

Input a run-time text string to the N-gram model.
Split the text into N-grams.
For each given N-gram in the input text string, do the following:
  Calculate the frequency of the given N-gram in input text string.
  Determine the probability of the given N-gram in all languages of the given symbol script family from the stored results of the N-gram probability model; these are the results of equation (7).
For each language A of the given symbol script family, calculate a score for the text string being in language A according to equation (4),
Score(text ∈ language A) = Σ P(N-gram ∈ language A) * Frequency(N-gram) for all N-grams. (8)
Note that the sum in equation (8) is computed over all of the N-grams in text string.
Calculate a confidence of for each given language A normalized to the sum of the score for all of the languages in the symbol script family, according to equation (9):

$$\text{Confidence}(\text{text} \in \text{language } A) = \frac{\text{Score}(\text{text} \in \text{language } A)}{\sum \text{Score}(\text{text} \in \text{language}) \text{ for all languages}} \quad (9)$$

An example implementation of the word model applied to the single-work text string "สวัสดีชาวโลก thai language ภาษา" gives the following results: P(Thai)=0.8 and P(English)=0.2.

In test implementations of the N-gram model, it has been found that the input text string may sometimes be too short and similar in different languages, resulting in erroneous identifications. For example, an N-gram model applied to the English-language word "credential" was found to yield P(Portuguese)=0.6 and P(English)=0.4. A possible explanation for this misidentification is that the Portuguese translation of the English-language word "credential" is "credencial." Thus most N-grams are nearly identical in both languages. The inventors have discovered these and other types of potential inaccuracies and erroneous detections may be reduced or eliminated by combining word and N-gram models in a hybrid language detection model. This described next.

Hybrid Model.

The inventors have discovered that languages within a given symbol script family all tend to be accurately and/or well analyzed by the same combination of model components, and that the combination of components may be different for different symbol script families. In accordance with example embodiments, a hybrid model for language detection may be developed by computing weight factors for each model component in order to identify particular components for inclusion in a respective hybrid model for each symbol script family, and storing the weight factors for run-time computation of weighted averages of scores for each language as part of run-time analysis of run-time text strings.

An example algorithm for hybrid model development is described below. The example algorithm is illustrated in Table 6.

TABLE 6

For each given language, do the following steps.
Identify each symbol script family in which the given language is a member.
Apply all model components from (1-Gram to 5-Gram, word probability model) to the training data and calculate scores for the given language.
For each given symbol script family, use the results of the scores to determine one or more weight factors for each model component. The weight factors may be used (1) to determine which model components to include in the hybrid model for the given symbol script family, and (2) for computing weighted sums of language scores determined during run-time analysis of run-time text strings.

From results for all of the one or more languages in each given symbol script family, a family weight factor may be computed for each of the models according to the scores determined by each of the models for the one or more languages of the given symbol script family. In an example embodiment, the family weight factor for a given model is an average over the languages of the given symbol script family of the scores produced by the given model. However, other computations of weight factors may be used. For each given symbol script family, the models yielding the highest weight factors may then be selected for inclusion in a hybrid model for the given symbol script family. For example, a threshold may be applied to weight factors of a given symbol script family in order for a model to be included in the hybrid model for the given family. In this way, only models that are determined to perform well may be included in a hybrid model. This enables computations associated with models that do not contribute significantly (e.g., greater than a threshold) to accurate results to be bypassed or omitted during run-time application of the resulting hybrid models to run-time text strings.

A hybrid model for a given symbol script family may thus include a word model and one or more N-gram models, for example, depending on the weights determined for the given family. As noted above, a word model does not apply to certain symbol script families, such as CJK and Hiragana, so the corresponding weight factors may be taken to be zero, and the word model omitted from hybrid models for these symbol script families. However, more than one N-gram model may yield acceptable weights to be included in a hybrid model for families that do not have the concept of words.

It should also be noted that some languages may be members of more than one symbol script family. For example, the Japanese language belongs the CJK, Hiragana, and Kana symbol script families. Thus, more than one hybrid model may be applicable to such languages.

In accordance with example embodiments, the hybrid model of for a given symbol script family may be applied at run-time to a run-time text string in order to determine scores for each language of the given family. The score for each language of the given family may be a weighted average scores from the individual model components computed using the weight factors determined during hybrid model development. For any particular language that is a member of more than one symbol script family, a separate weighted score may be computed using the hybrid model for each different family. Multiple weighted scores for the particular language may then be tallied in a script-weighted sum, where the script weights are the respective probabilities from the symbol script family model applied to each of the families in which the particular language is a member to determine a confidence. Finally, the language with highest confidence among all the languages may be identified as the most likely language of the run-time text string.

Run-time application of an example hybrid model may be described in analytical terms as follows. Let $S=\{s_1, s_2, \ldots\}$ be the set of symbol script families of the hybrid model, and let the model components and corresponding weights of symbol script family $s_i$ be $X_i=\{x_{i1}, x_{i2}, \ldots\}$ and $W_i=\{w_{i1}, w_{i2}, \ldots\}$. As described above and illustrated by way of example below, $X_i$ represents a subset of all possible model components (e.g., 1-Gram to 5-Gram, word probability model) for which the elements of $W_i$ each exceed a threshold as determined during hybrid model development. Let the respective probabilities of a given run-time text string being in S be $U=\{u_1, u_2, \ldots\}$, where U is determined from equation (1) of the symbol script family model applied to the given run-time text string at run-time. Finally, let the scores for language A from the model components of $s_i$ be $R_i(A)=\{r_{i1}(A), r_{i2}(A), \ldots\}$. These are the scores determined according to equations (4) and (8). With this notation, and taking $i=1, \ldots, n$ as indexing the symbol script families, and $\{j\}_i$ as indexing the particular model components of symbol script family i, the final weighted score for the given run-time text string being in language A of just symbol script family $s_i$ may be expressed as:

$$Score_i(\text{text} \in \text{language } A) = \sum_{\{j\}_i} \frac{w_{ij} r_{ij}}{\sum_{\{j\}_i} w_{ij}}. \quad (10)$$

The final confidence for the given run-time text string being in language A of all symbol script families may be expressed as:

$$\text{Confidence}(\text{text} \in \text{language } A) = \sum_{i=1}^{n} u_i \; Score_i = \sum_{i=1}^{n} u_i \sum_{\{j\}_i} \frac{w_{ij} r_{ij}}{\sum_{\{j\}_i} w_{ij}}. \quad (11)$$

Equation (11) may be computed for each language among the all the symbol script families S. The maximum confidence among all computed confidences may then be taken to identify the language of the given run-time text string. Note that for any symbol script family $s_i$ having only one member language, no further model needs to be applied since $Score_i=1$ by definition. This can be accommodated in equations (10) and (11) by reserving j=0 for this case, and setting $w_{i0}=r_{i0}=1$.

Equation (11) represents a generalized analytical form of an example hybrid language model for identification or detection of the language of an input text string. In accordance with example embodiments, determination of parameters of the model during model development may simplify practical implementation. For example, as described below, $\{j\}_i$ for a given $s_i$ may identify only one or two model components and corresponding weight factors. Further, determination of U for a given text string at run-time may also simplify operation since any $s_i$ for which $u_i$ is zero need not be considered during run-time computation. Also, for any language that is the only member of a symbol script family $s_i$, it may immediately be determined that $Score_i=1$ (assuming also that $u_i>0$). Additionally, if $u_i=1$ and $s_i$ has only one member family, then it may immediately be determined) that Confidence=1 for the single language of $s_i$.

Finally, in the event that U=0 for all i for a given text string, then the language of the text string as determined by the model may be considered unknown. In practice, this situation is likely to be rare or non-existent, since the model may be constructed to include all or most know symbol script families, and also may be extended any time such a situation arises.

An example algorithm for run-time application of a hybrid language model is illustrated in Table 7.

TABLE 7

| |
|---|
| Receive a run-time text string. |
| Compute U according to equation (1). |
| If $u_i = 1$ and $s_i$ has only one member language, identify the one member language to be that of the run-time text string, and skip the remaining steps. |
| For each $s_i$ having $u_i > 0$, compute $Score_i$ for each language in $s_i$ according to equation (10). |
| For each language for which $Score_i$ has been computed, compute a Confidence according to equation (11). |
| Determine the maximum Confidence. |
| Identify the language of the run-time text string as the one having the highest Confidence. |

Figure 7:
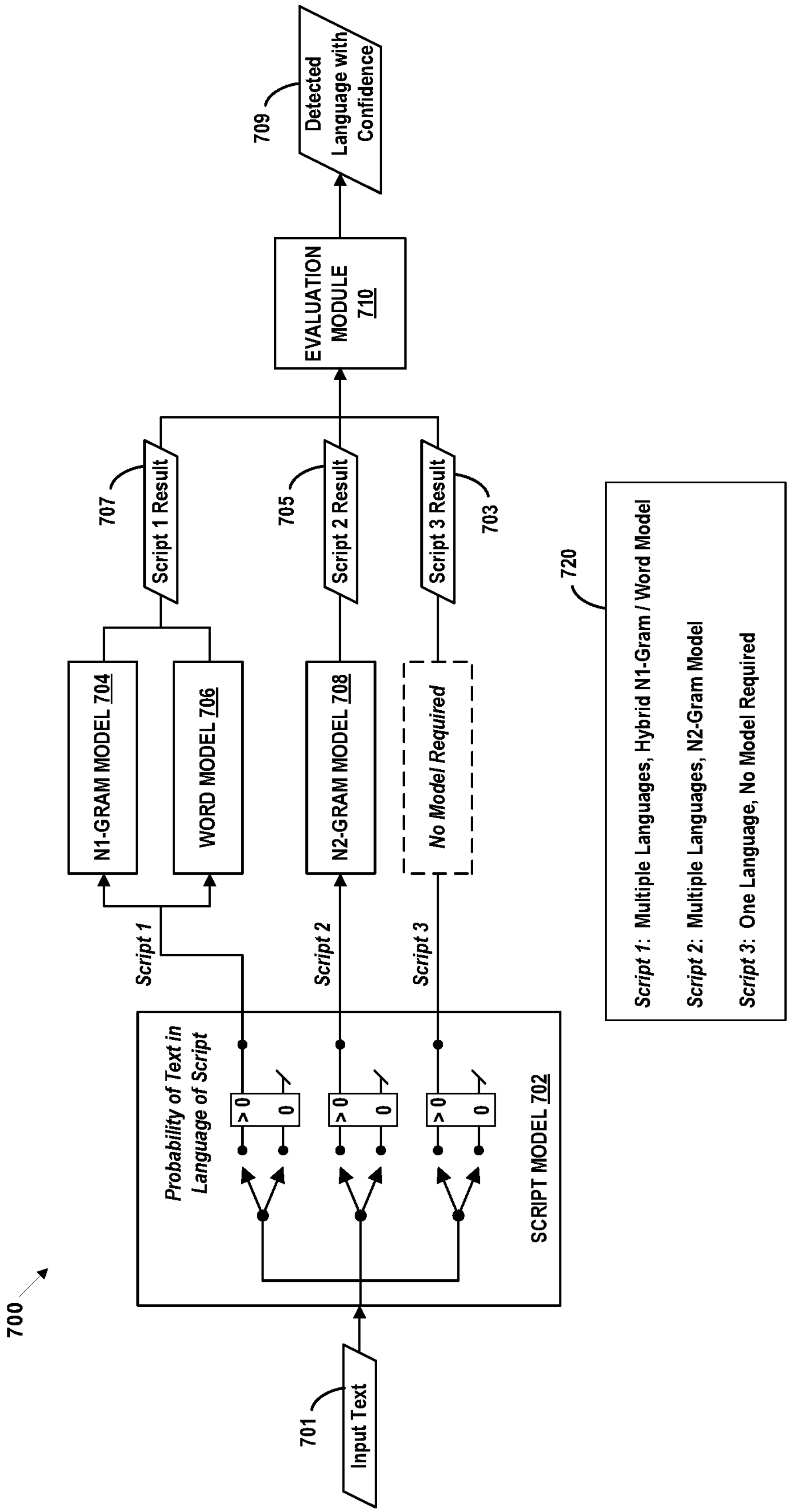
FIG. 7 is a high-level architecture diagram of a system for language detection, in accordance with example embodiments.

FIG. 7 is a high-level architecture diagram of a system 700 for language detection, in accordance with example embodiments. System 700 may include a script model 702, a hybrid model including N1-Gram model 704 and word model 706, a hybrid model including N2-Gram model 708, and an evaluation module 710. By way of example, the model components of system 700 are developed for two multi-language symbol script families and one or more single-language symbol script families, as indicated by the legend 720. Namely, "Script 1" is a multi-language symbol script family having a hybrid model including an N1-Gram model 704 and a word model 706. "Script 2" is a multi-language symbol script family having a hybrid model including an N2-Gram model 708, which could be a single or multiple N gram model. "Script 3" is any one or more symbol script families each having only a single language as a family member. Note that no model is required for analysis of text strings determined to include characters categorized in any Script 3 symbol script families.

In example operation, a text string 701 may be input to script model 702, which may categorize the characters in the text string according to membership in each of the symbol script families, and then apply equation (1) to determine the probabilities U. As illustrated conceptually, script model 702 acts as sort of "switch" that passes the text string 701 to the language detection models for any $u_i>0$ and skips or omits any further analysis or processing of the text string 701 for any $u_i=0$. Thus, for example, if text string 701 includes any characters categorized in a Script 1 symbol script family, then $u_{Script\ 1}>0$, and the text string will be input to the hybrid model for Script 1 analysis. If $u_{Script\ 1}=0$, text 701 will not be input for Script 1 analysis. Similarly, if text string 701 includes any characters categorized in a Script 2 symbol script family, then $u_{Script\ 2}>0$, and the text string will be input to the hybrid model for Script 2 analysis; and if $u_{Script\ 2}=0$, text 701 will not be input for Script 2 analysis. And if text string 701 includes any characters categorized in a Script 3 symbol script family, then $u_{Script\ 3}>0$, and no model is needed to determine that $Score_{Script\ 3}=1$; and if $u_{Script\ 3}=0$, text string 701 will not be further analyzed on the script 3 track since $Score_{Script\ 3}=0$.

The output of the hybrid model for Script 1 is a Script 1 Result 707, which may include a respective $Score_{Script\ 1}$ for each language in the Script 1 symbol script family, as calculated according to equation (10), for example. Similarly, the hybrid model for Script 2 is a Script 2 Result 705, which may include a respective $Score_{Script\ 2}$ for each language in the Script 2 symbol script family. If $u_{Script\ 3}>0$, then the Script 3 Result 703 may include $Score_{script\ 3}=1$ for each of one or more symbol script families that each have only one member language.

The results of language analysis (Results 703, 705, and 707) are input to the evaluation module 710, which computes a final confidence for each language, according to equation (11), for example. As described above, this computation is a sum of scores for each language weighted by the appropriate elements of U. The output 709 is the detected or identified language of the text string 701 with its calculated confidence. As described above, the identified language may be the one with the highest confidence, and determined from equation (11), for example. In an example embodiment, the output 709 may include identifications and confidence determinations all of the languages having confidences above some threshold. Other information may be included in the output 709 as well.

B. Example Weighting Determination and Operation of Hybrid Model

As discussed above, the specific model components of a hybrid model for a particular symbol script family may be determined empirically from training data. In the formalism of equations (10) and (11), the model components of a hybrid model for symbol script family $s_i$ may be identified by indices $\{j\}_i$. Example hybrid model development according to empirical determination weight factors $w_{ij}$ is illustrated in Tables 8 and 9 for the example symbol script families listed in Table 1. The first column of Table 8 identifies the symbol script families, and the second column identifies the individual languages. The results of the model components for each language are listed in the third through eighth columns. It should be understood that the results illustrated below represent an example of model development, and other examples are possible.

For each language, a model score according to equation (4) for a word probability model or equation (8) for an N-gram model is listed. Specifically, the third column lists word model scores according to equation (4) for each language having the concept of words. The fourth through eighth columns list, for each language, N-gram model scores according to equation (8) for 1-gram, 2-gram, 3-gram, 4-gram, and 5-gram models, respectively.

In accordance with example embodiments, the highest scores may be used to identify and/or select which model components to include in a particular hybrid model. For purposes of convenience of identification in the present discussion, the selected scores for each symbol script family are displayed in boldface font. As evident from inspection, the word and 5-gram models yield the highest scores languages in the Latin symbol script family. For the Arabic symbol script family, a 3-gram model gives the best results. For the CJK symbol script family, 1-gram and 2-gram models give the best results. For the Greek, Thai, Hebrew, and Hangul symbol script families, a 1-gram model gives the best result. And for the Hiragana, Kana, and Katakana symbol script families, a 2-gram model gives the best results.

TABLE 8

| Script | Language | Word | 1-Gram | 2-Gram | 3-Gram | 4-Gram | 5-Gram |
|---|---|---|---|---|---|---|---|
| | Catalan | 34.28 | 5.66 | 7.63 | 11.61 | 17.26 | 23.57 |
| | Czech | 24.64 | 5.38 | 10.30 | 15.37 | 20.38 | 23.94 |
| | Danish | 31.09 | 5.90 | 8.17 | 12.55 | 18.36 | 23.94 |
| Latin | German | 31.42 | 5.62 | 7.81 | 12.35 | 18.60 | 24.20 |
| | English | 33.21 | 6.90 | 8.30 | 11.70 | 17.12 | 22.77 |
| | Spanish | 31.87 | 6.06 | 8.26 | 12.25 | 17.89 | 23.67 |
| | Finnish | 27.58 | 4.98 | 8.04 | 13.26 | 20.18 | 25.96 |
| | French | 31.70 | 5.62 | 8.34 | 12.76 | 18.16 | 23.43 |
| | Hungarian | 25.04 | 4.78 | 9.50 | 14.95 | 20.90 | 24.83 |
| | Indonesian | 34.30 | 4.70 | 6.48 | 10.80 | 18.30 | 25.42 |
| | Italian | 36.19 | 5.57 | 7.16 | 10.83 | 16.69 | 23.55 |
| | Dutch | 32.77 | 5.50 | 7.65 | 11.86 | 18.00 | 24.22 |
| | Norwegian | 30.72 | 7.87 | 8.61 | 12.14 | 17.39 | 23.26 |
| | Polish | 24.38 | 5.57 | 10.54 | 15.59 | 20.39 | 23.54 |
| | Portuguese | 32.49 | 5.38 | 7.94 | 12.11 | 18.12 | 23.96 |
| | Romanian | 30.61 | 5.21 | 8.77 | 13.08 | 18.57 | 23.76 |
| | Swedish | 35.30 | 7.57 | 9.43 | 11.56 | 15.67 | 20.47 |
| | Turkish | 26.57 | 6.05 | 10.00 | 14.24 | 19.52 | 23.61 |
| | Vietnamese | 23.96 | 5.50 | 12.18 | 17.64 | 20.16 | 20.56 |
| | Bulgarian | NA | 17.45 | 17.91 | 19.42 | 21.64 | 23.58 |
| Cyrillic | Russian | NA | 17.80 | 17.76 | 19.64 | 21.62 | 23.19 |
| | Ukrainian | NA | 16.60 | 18.04 | 20.14 | 21.98 | 23.23 |
| Arabic | Arabic | NA | 18.50 | 19.95 | 20.62 | 20.75 | 20.18 |
| | Persian | NA | 18.85 | 19.97 | 20.54 | 20.61 | 20.03 |
| | Chinese | NA | 31.31 | 32.72 | 35.97 | NA | NA |
| CJK | Japanese | NA | 32.06 | 34.17 | 33.77 | NA | NA |
| | Korean | NA | 22.50 | 20.66 | 19.12 | NA | NA |
| Greek | Greek | NA | 23.28 | 21.42 | 19.83 | 18.40 | 17.07 |
| Thai | Thai | NA | 23.19 | 21.43 | 19.88 | 18.43 | 17.08 |
| Hebrew | Hebrew | NA | 23.51 | 21.36 | 19.77 | 18.34 | 17.03 |

TABLE 8-continued

| Script | Language | Word | 1-Gram | 2-Gram | 3-Gram | 4-Gram | 5-Gram |
|---|---|---|---|---|---|---|---|
| Hiragana | Japanese | NA | 32.06 | 34.17 | 33.77 | NA | NA |
| Kana | Japanese | NA | 32.06 | 34.17 | 33.77 | NA | NA |
| Katakana | Japanese | NA | 32.06 | 34.17 | 33.77 | NA | NA |
| Hangul | Korean | NA | 22.50 | 20.66 | 19.12 | NA | NA |

The identifications from Table 8 may thus be used to determine the model components for respective hybrid models for each symbol script family. In accordance with example embodiments, the weight factors for each hybrid model may be computed as the average of the scores in the high-score columns for each model. For example, for the Latin hybrid model, the average word score is 30.43 and the average 5-gram score is 26.31. In terms of the formalism of equations (10) and (11), then, $w_{Latin,word}$=30.43, and $w_{Latin,5\text{-}gram}$=26.31. Table 9 summarize the weight determinations for each hybrid model. In Table 9, all possible weight factors are listed, with the ones selected for use in the models displayed in boldface font. Note that for purposes of the present discussion, the term "hybrid" is being applied here even for a model with just one model component.

TABLE 9

| Family | Word | 1 Gram | 2 Gram | 3 Gram | 4 Gram | 5 Gram |
|---|---|---|---|---|---|---|
| Latin | 30.43 | 5.78 | 8.69 | 12.98 | 18.51 | 23.61 |
| Cyrillic | NA | 17.28 | 17.9 | 19.73 | 21.75 | 23.33 |
| Arabic | NA | 18.68 | 19.96 | 20.58 | 20.68 | 20.11 |
| CJK | NA | 28.62 | 29.18 | 29.62 | NA | NA |
| Hiragana | | | | Model not required | | |
| Kana | | | | | | |
| Katakana | | | | | | |
| Hangul | | | | | | |
| Greek | | | | | | |
| Thai | | | | | | |
| Hebrew | | | | | | |

The weights identified in Table 9 may be used in the weighted score calculation at run-time of equation (10). For example, the weighted score for a run-time text string for a language $A_{Latin}$ in the Latin symbol script family may be express as:

$$Score_{Latin}(\text{text} \in \text{language } A_{Latin}) = \frac{30.43 \cdot Score_{word}(A_{Latin}) + 23.61 \cdot Score_{5-gram}(A_{Latin})}{30.43 + 23.61}. \quad (12)$$

Similarly, the weighted score for a run-time text string for a language $A_{CJK}$ in the CJK symbol script family may be express as:

$$Score_{CJK}(\text{text} \in \text{language } A_{CJK}) = \frac{28.62 \cdot Score_{1-gram}(A_{CJK}) + 29.18 \cdot Score_{2-gram}(A_{CJK})}{28.62 + 29.18}. \quad (13)$$

Operation of an example implementation hybrid language model system for language detection may be illustrated by of three example applications.

Example 1

In the first example a run-time text string "veuillez résoudre le problème" is received. This text string contains only Latin characters, so the symbol script model yields $u_{Latin}$=1 and $u_i$=0 for all other symbol scripts. Application of equation (12) in the example implementation to the text string yields the following hybrid model scores: Score ({Latin languages}={Czech: 0.0133, Dutch: 0.0107, Finnish: 0.0028, French: 0.7782, German: 0.0062, Hungarian: 0.0314, Italian: 0.0431, Polish: 0.0065, Portuguese: 0.0067, Spanish: 0.0305, English: 0.0079, Catalan: 0.014, Danish: 0.0082, Indonesian: 0.0024, Norwegian: 0.0083, Swedish: 0.0041, Turkish: 0.0065, Romanian: 0.0165, Vietnamese: 0.0028}. Since $u_{Latin}$=1 for all these languages, application of equation (11) is just multiplication by one. Thus, the language of the text string may be identified as French, with a confidence of 0.7782.

Example 2

In the second example a run-time text string "問題を解決してください" is received. This text string contains Chinese and Japanese characters from the CJK symbol script family and Japanese characters from the Hiragana symbol script family. Application of the symbol script family model to the text string yields $u_{CJK}$=0.3636 and $u_{Hiragana}$=0.6364; $u_i$=0 for all other symbol scripts. Application of the CJK hybrid model yields $Score_{CJK}$({CJK languages})={Chinese: 0.0938, Korean: 0, Japanese: 0.9062}. Since Japanese is the only language of the Hiragana symbol script family, $Score_{Hiragana}$(Japanese)=1. And because Japanese is a member of both CJK and Hiragana, the weighted sum according to equation (11) includes two terms for the score for Japanese. Accordingly, equation (11) yields:

$$\text{Confidence}(\text{text} \in \text{Chinese}) = 0.3636 \times 0.0938 = 0.0341,$$

and $$\text{Confidence}(\text{text} \in \text{Japanese}) = 0.3636 \times 0.9062 + 0.6364 \times 1 = 0.9659.$$

Thus, the identified language of the input text string is Japanese with a confidence of 0.9659.

Example 3

In the third example, a run-time text string "โปรดแก้ไขปัญหา" is received. This text string contains only Thai characters, so the symbol script model yields $u_{Thai}$=1 and $u_i$=0 for all other symbol scripts. Since Thai is the only language in the Thai symbol script family, $Score_{Thai}$=1. And since $u_{Thai}$=1, the identified language is Thai with a Confidence=1.

Example and test implementations of hybrid language detection models demonstrate their superior performance over single-model detection for those symbol script families for which model development indicates multiple models. An example of comparative performance results for the above Latin hybrid model is shown in Table 10.

TABLE 10

| Text String Length (ℓ) | 1-gram | 2-gram | 3-gram | 4-gram | 5-gram | Word | Hybrid |
|---|---|---|---|---|---|---|---|
| ℓ<20 characters | 51.3 | 69.2 | 73.4 | 77.4 | 77.5 | 75.1 | 84.7 |
| 20 ≤ℓ≤ 50 characters | 58.1 | 79.9 | 86.3 | 89.4 | 89.7 | 87.0 | 96.0 |
| ℓ >50 characters | 59.0 | 79.7 | 90.4 | 93.4 | 92.6 | 93.1 | 99.1 |

The results displayed are for three ranges of text string length, as indicated in the first column. The next six columns show scores for single N-gram and word models. The last column shows the results for the hybrid model. It may be seen by inspection that the hybrid model out performs all of the single models. Similar results may be demonstrated for hybrid models for other symbol script families. These results show at least the improvement obtained by hybrid language detection models developed and operated in accordance with example embodiments.

VI. Example Methods

Figure 8A:
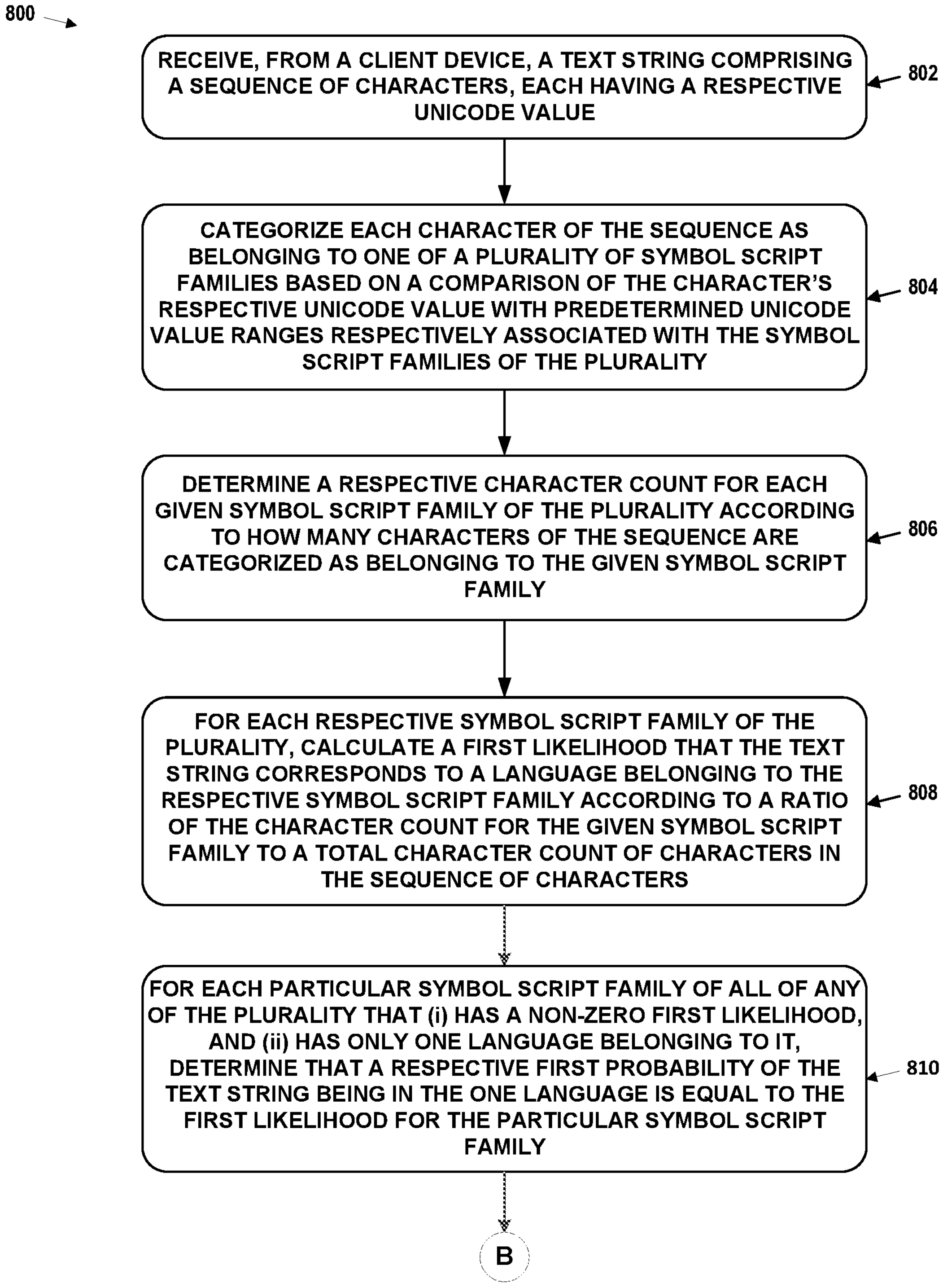
FIGS. 8A and 8B show a single flow chart, in accordance with example embodiments; the single flow chart is split across two figure pages to accommodate space considerations, but should be considered together as a whole.
Figure 8B:
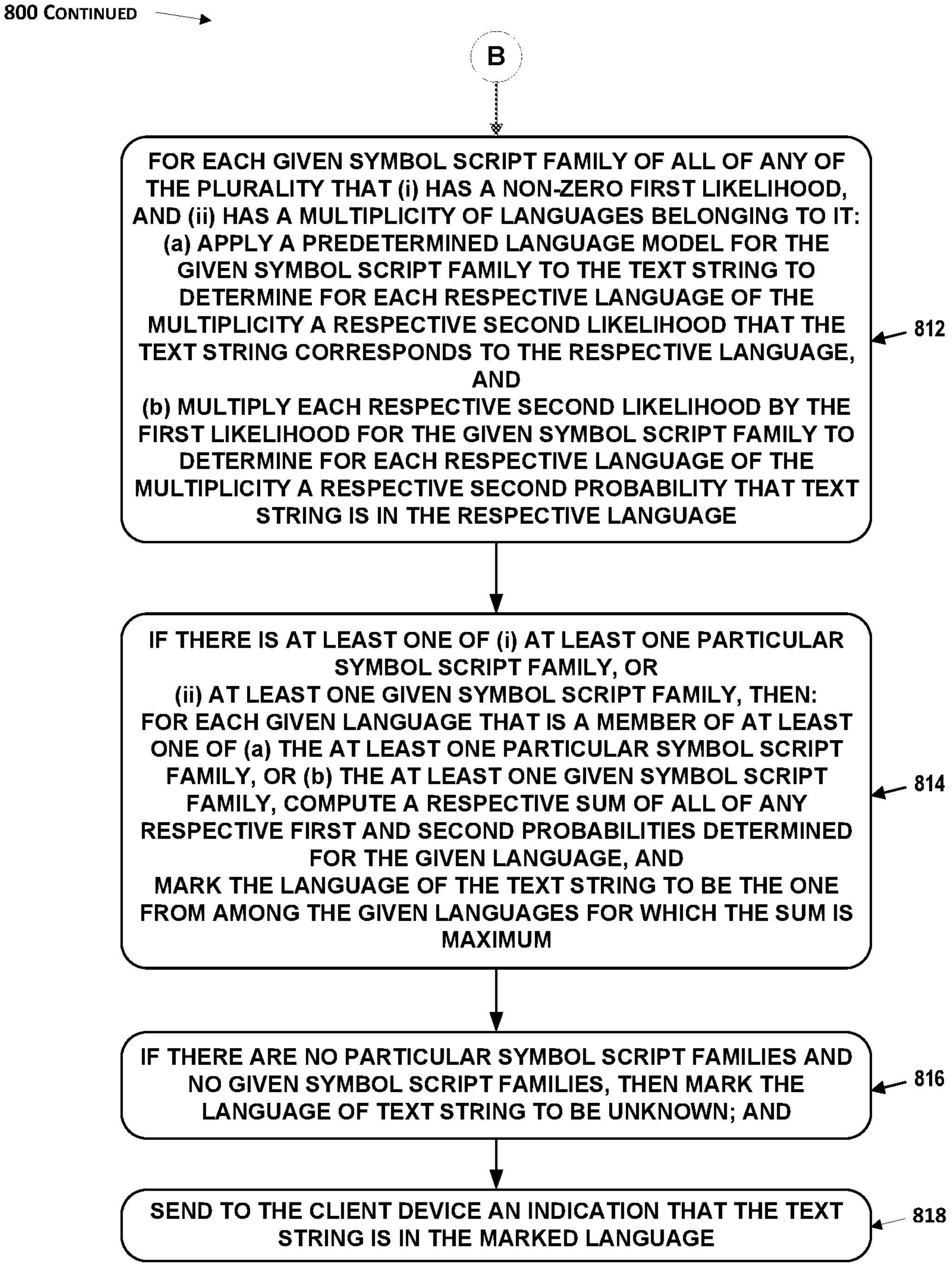

FIGS. 8A and 8B show a single flow chart, illustrating an example method 800, in accordance with example embodiments. Note the single flow chart is split across two figure pages merely to accommodate space considerations, but should be considered together as a whole. The example method 800 may be carried out by a one or more computing devices, such as computing device 100, and/or a cluster of computing devices, such as server cluster 200. For the purposes of example, the process illustrated by FIG. 8A and its continuation in FIG. 8B will be described as being carried out by a software application or applications, such as software applications that are executable on a computing device of computational instance 322 of remote network management platform 320. However, the process can be carried out by other types of devices or device subsystems. For example, the process could be carried out by a portable computer, such as a laptop or a tablet device.

In the context of the present discussion, the remote network management platform and the computational instance of the platform, including a computing device of the computational instance and a server device of the remote network management platform, may be referred to concisely as a "system." As such, system may be considered as being configured to carry out the example method 800.

In accordance with example embodiments, the software applications may be implemented as instructions stored in computer-readable memory, such as non-transient computer-readable media. When the instructions are executed by one or more processors of the one or more computing devices of the system, the one or more computing devices of the system may be caused to carry out the example method 800.

The embodiments of FIGS. 8A and 8B may be simplified by the removal of any one or more of the features shown therein. Further, these embodiments may be combined with features, aspects, and/or implementations of any of the previous figures or otherwise described herein.

Block 802 involves receiving a text string comprising a sequence of characters from a client device. Each character may have a respective Unicode value.

Block 804 involves categorizing each character of the sequence as belonging to one of a plurality of symbol script families. In an example embodiment, the plurality of symbol script families may correspond to S, described above. The categorization may be based on a comparison of the character's respective Unicode value with predetermined Unicode value ranges respectively associated with the symbol script families of the plurality.

Block 806 involves determining a respective character count for each given symbol script family of the plurality according to how many characters of the sequence are categorized as belonging to the given symbol script family.

Block 808 involves a calculation of a first likelihood for each respective symbol script family of the plurality. Specifically, the first likelihood for each symbol script family is a likelihood that the text string corresponds to a language belonging to the respective symbol script family. Each likelihood may be calculated according to a ratio of the character count for the given symbol script family to a total character count of characters in the sequence of characters. In an example embodiment, the first likelihood for each symbol script family $s_i$ may correspond to $u_i$, described above.

Block 810 involves, for each particular symbol script family of all of any of the plurality that (i) has a non-zero first likelihood, and (ii) has only one language belonging to it, determining that a respective first probability of the text string being in the one language is equal to the first likelihood for the particular symbol script family. Here, the phrase "all of any" is meant to account for the possibility of none of the plurality meeting both (i) and (ii). In an example embodiment, the first probability may correspond to the confidence described above, where, for the case of a single language in a symbol script family, the confidence=$u_i$, since the confidence is computed as $u_i$×score, and score=1 for a single-language symbol script family.

Block 812 involves identifying all of any of the plurality that (i) has a non-zero first likelihood, and (ii) has a multiplicity of languages belonging to it, and then for each given symbol script family so identified, carrying out hybrid model analysis of the text string. The hybrid model analysis may entail: (a) applying a predetermined language model for the given symbol script family to the text string to determine for each respective language of the multiplicity a respective second likelihood that the text string corresponds to the respective language, and (b) multiplying each respective second likelihood by the first likelihood for the given symbol script family to determine for each respective language of the multiplicity a respective second probability that text string is in the respective language. The phrase "all of any" is meant to account for the possibility of none of the plurality meeting both (i) and (ii). In accordance with example embodiments, as determined by (i) and (ii), the given symbol script family is a multi-language family, the respective second likelihood may correspond to the score for the respective language of the given family, and the respective second probability may correspond to the confidence.

Block 814 involves computing the weighted sum of confidence subject to the condition that at least one confidence has been computed in the previous operations. Namely, if there is at least one of (i) at least one particular symbol script family, or (ii) at least one given symbol script family, then: for each given language that is a member of at least one of (a) the at least one particular symbol script family, or (b) the at least one given symbol script family, computing a respective sum of all of any respective first and second probabilities determined for the given language, and marking the language of the text string to be the one from among the given languages for which the sum is maximum. The maximum of the sum may correspond to the maximum confidence.

Block 816 involves if there are no particular symbol script families and no given symbol script families, then marking the language of text string to be unknown. This operation accounts for the possibility that none of the characters of the text string are recognized as belonging to any of the plurality of symbol script families.

Block 818 involves sending to the client device an indication that the text string is in the marked language. In an example embodiment, this operation provides the client device with the language identification, as well as possibly the calculated confidence for the language identification.

In accordance with example embodiments, the predetermined language model may be a hybrid model. Any one symbol script family of the plurality to which more than one language belongs may have a hybrid model. Examples of hybrid models include: a word model, an N-gram model for one value of N, where N is a positive integer, a multi-N-gram model including a hybrid of two more N-gram models, each having a different value of N, a mixed model including a word model and an N-gram model, and a mixed multi model including a word model and a hybrid of two more N-gram models, each having a different value of N.

In further accordance with example embodiments, the word model may include an empirically-determined probability distribution of training words over all languages belonging to the one symbol script family. With this arrangement, applying the predetermined language model for the given symbol script family to the text string may entail applying the word model to each word of the text string to determine a respective score for the text string being in each language of the one symbol script family, and then calculating a respective confidence of the text string being each language of the one symbol script family as the respective score normalized to a sum of all of the respective scores.

In further accordance with example embodiments, the N-gram model may include an empirically-determined probability distribution of training N-grams over all languages belonging to the one symbol script family. With this arrangement, applying the predetermined language model for the given symbol script family to the text string may entail applying the N gram model to each N-gram of the text string to determine a respective score for the text string being in each language of the one symbol script family, and then calculating a respective confidence of the text string being each language of the one symbol script family as the respective score normalized to a sum of all of the respective scores.

In accordance with example embodiments, the mixed model including the word model and the N-gram model for the one symbol script family may include an empirically-determined probability distribution of training words over all languages belonging to the one symbol script family, and an empirically-determined probability distribution of training N-grams over all languages belonging to the one symbol script family. With this arrangement, applying the predetermined language model for the given symbol script family to the text string may entail applying the word model to each word of the text string to determine a respective word score for the text string being in each language of the one symbol script family, and applying the N-gram model to each N-gram of the text string to determine a respective N-gram score for the text string being in each language of the one symbol script family. Next, a respective mixed score for the text string being in each language of the one symbol script family may be calculated as a weighted sum of the respective word and N-gram scores normalized to a sum of weighting values, where the weighting values are respective weights applied to the respective word and N-gram scores in the weighted sum. Finally, a respective confidence of the text string being each language of the one symbol script family may be calculated as the respective mixed score normalized to a sum of all of the respective mixed scores.

In further accordance with example embodiments, the plurality of symbol script families may include includes: Latin, Cyrillic, Arabic, CJK, Hiragana, Kana, Katakana, Hangul, Greek, Thai, and Hebrew. Further, the languages belonging to the Latin symbol script family may include: Czech, Dutch, Finnish, French, German, Hungarian, Italian, Polish, Portuguese, Spanish, English, Catalan, Danish, Indonesian, Norwegian, Swedish, Turkish, Romanian, and Vietnamese. The languages belonging to the Cyrillic symbol script family may include: Bulgarian, Russian, and Ukrainian. The languages belonging to the Arabic symbol script family may include: Arabic, and Persian. The languages belonging to the CJK symbol script family may include: Chinese, Japanese, and Korean. The languages belonging to the Hiragana symbol script family may include: Japanese; the languages belonging to the Kana symbol script family may include: Japanese; the languages belonging to the Katakana symbol script family may include: Japanese; the languages belonging to the Hangul symbol script family may include: Korean; the languages belonging to the Greek symbol script family may include: Greek; the languages belonging to the Thai symbol script family may include: Thai; and the languages belonging to the Hebrew symbol script family may include: Hebrew.

In accordance with example embodiments, the language model for the Latin symbol script family may be a hybrid word and 5-gram model, the language model for the Cyrillic symbol script family may be a 5-gram model, the language model for the Arabic symbol script family may be a 3-gram model, and the language model for the CJK symbol script family may be a hybrid 1-gram and 2-gram model.

In further accordance with example embodiments, applying the predetermined model for the given symbol script family to the text string may entail removing characters from the text string that are not characterized as belonging to the given symbol script family prior to applying the predetermined model to the text string.

In accordance with example embodiments, the example method may entail using on training data including written text in the multiplicity of languages. Then determining, for each of the predetermined language models, a distribution of text-structure decompositions of the training data over the multiplicity of languages. For each of the predetermined language models, the text-structure decompositions may all be either words or N-grams. Next, a respective probability of each of the text-structure decompositions being in each of the multiplicity of languages may be determined. Finally, a respective confidence of each of the text-structure decompositions being in each of the multiplicity of languages may be determined with respect to all of the languages of the multiplicity.

VII. Closing

The present disclosure is not to be limited in terms of the particular embodiments described in this application, which are intended as illustrations of various aspects. Many modifications and variations can be made without departing from its scope, as will be apparent to those skilled in the art.

Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:

persistent storage containing representations of a plurality of symbol script families; and one or more processors configured to:

obtain a text string comprising a sequence of characters, each of the characters having a respective value of a character encoding scheme;

categorize the characters as belonging to one of the plurality of symbol script families;

determine a respective character count for each given symbol script family of the plurality according to how many characters of the sequence are categorized as belonging to the given symbol script family;

for each respective symbol script family of the plurality, calculate a likelihood that the text string corresponds to a language belonging to the respective symbol script family according to a ratio of the character count for the given symbol script family to a total character count of characters in the sequence of characters of the given text string;

for each particular symbol script family having a non-zero likelihood, compute a respective probability that each of one or more languages belonging to the particular symbol script family is the language of the text string;

for any language belonging to more than one particular symbol script family, replace its respective probability with a sum of its respective probabilities across the more than one particular symbol script family to which it belongs; and determine the language of the text string according to a maximum of the respective probabilities.

2. The system of claim 1, wherein categorizing the characters as belonging to one of the plurality of symbol script families comprises comparing each character's respective value of the character encoding scheme with predetermined value ranges of the character encoding scheme respectively associated with the symbol script families of the plurality.

3. The system of claim 2, wherein, for each particular symbol script family having a non-zero likelihood, computing the respective probability that each of the one or more languages belonging to the particular symbol script family is the language of the text string comprises:

for each particular symbol script family of all of any of the plurality that (i) has a non-zero likelihood, and (ii) has only one language belonging to it, determining that a respective first probability of the text string being in the one language is equal to the likelihood for the particular symbol script family;

wherein, for any language belonging to more than one particular symbol script family, replacing its respective probability with the sum of its respective probabilities across the more than one particular symbol script family to which it belongs comprises:

for each given symbol script family of all of any of the plurality that (i) has a non-zero likelihood, and (ii) has a multiplicity of languages belonging to it:

(a) applying a predetermined language model for the given symbol script family to the text string to determine for each respective language of the multiplicity a respective second likelihood that the text string corresponds to the respective language, (b) multiplying each respective second likelihood by the likelihood for the given symbol script family to determine for each respective language of the multiplicity a respective second probability that text string is in the respective language; and (c) computing a respective sum of all of any second probabilities determined for the given language;

and wherein determining the language of the text string according to a maximum of the respective probabilities comprises:

if there is at least one of (i) at least one particular symbol script family, or (ii) at least one given symbol script family, then:

for each given language that is a member of at least one of (a) the at least one particular symbol script family, or (b) the at least one given symbol script family, adding a respective sum of all of any respective first probabilities to the respective sums of the second probabilities, and determining the language of the text string to be the one from among the given languages for which the sum is maximum;

and wherein the one or more processors are further configured to determine the language of text string to be unknown, if there are no particular symbol script families and no given symbol script families.

4. The system of claim 3, wherein, for any one symbol script family of the plurality to which more than one language belongs, the predetermined language model is one of:

a word model, an N-gram model for one value of N, wherein N is a positive integer, a multi-N-gram model including a hybrid of two more N-gram models, each having a different value of N, a mixed model including a word model and an N-gram model, or a mixed multi model including a word model and a hybrid of two more N-gram models, each having a different value of N.

5. The system of claim 4, wherein the word model for the one symbol script family comprises an empirically-determined probability distribution of training words over all languages belonging to the one symbol script family, and wherein applying the predetermined language model for the given symbol script family to the text string comprises:

applying the word model to each word of the text string to determine a respective score for the text string being in each language of the one symbol script family; and calculating a respective confidence of the text string being each language of the one symbol script family as the respective score normalized to a sum of all of the respective scores.

6. The system of claim 4, wherein the N-gram model for the one symbol script family comprises an empirically-determined probability distribution of training N-grams over all languages belonging to the one symbol script family, and wherein applying the predetermined language model for the given symbol script family to the text string comprises:

applying the N-gram model to each N-gram of the text string to determine a respective score for the text string being in each language of the one symbol script family; and calculating a respective confidence of the text string being each language of the one symbol script family as the respective score normalized to a sum of all of the respective scores.

7. The system of claim 4, wherein the mixed model including the word model and the N-gram model for the one symbol script family comprises:

an empirically-determined probability distribution of training words over all languages belonging to the one symbol script family, and an empirically-determined probability distribution of training N-grams over all languages belonging to the one symbol script family, and wherein applying the predetermined language model for the given symbol script family to the text string comprises:

applying the word model to each word of the text string to determine a respective word score for the text string being in each language of the one symbol script family;

applying the N-gram model to each N-gram of the text string to determine a respective N-gram score for the text string being in each language of the one symbol script family;

calculating a respective mixed score for the text string being in each language of the one symbol script family as a weighted sum of the respective word and N-gram scores normalized to a sum of weighting values, wherein the weighting values are respective weights applied to the respective word and N-gram scores in the weighted sum; and calculating a respective confidence of the text string being each language of the one symbol script family as the respective mixed score normalized to a sum of all of the respective mixed scores.

8. The system of claim 1, wherein the character encoding scheme is one of Unicode or American Standard Code for Information Interchange (ASCII).

9. The system of claim 3, wherein the plurality of symbol script families includes:

Latin, Cyrillic, Arabic, CJK, Hiragana, Kana, Katakana, Hangul, Greek, Thai, and Hebrew, wherein the languages belonging to the Latin symbol script family include: Czech, Dutch, Finnish, French, German, Hungarian, Italian, Polish, Portuguese, Spanish, English, Catalan, Danish, Indonesian, Norwegian, Swedish, Turkish, Romanian, and Vietnamese, wherein the languages belonging to the Cyrillic symbol script family include: Bulgarian, Russian, and Ukrainian, wherein the languages belonging to the Arabic symbol script family include: Arabic, and Persian, wherein the languages belonging to the CJK symbol script family include: Chinese, Japanese, and Korean, wherein the languages belonging to the Hiragana symbol script family include: Japanese, wherein the languages belonging to the Kana symbol script family include: Japanese, wherein the languages belonging to the Katakana symbol script family include: Japanese, wherein the languages belonging to the Hangul symbol script family include: Korean, wherein the languages belonging to the Greek symbol script family include: Greek, wherein the languages belonging to the Thai symbol script family include: Thai, wherein the languages belonging to the Hebrew symbol script family include: Hebrew, wherein the language model for the Latin symbol script family is a hybrid word and 5-gram model, wherein the language model for the Cyrillic symbol script family is 5-gram model, wherein the language model for the Arabic symbol script family is 3-gram model, and wherein the language model for the CJK symbol script family is hybrid 1-gram and 2-gram model.

10. A method comprising:

obtaining a text string comprising a sequence of characters, each of the characters having a respective value of a character encoding scheme;

categorizing the characters as belonging to one of a plurality of symbol script families;

determining a respective character count for each given symbol script family of the plurality according to how many characters of the sequence are categorized as belonging to the given symbol script family;

for each respective symbol script family of the plurality, calculating a likelihood that the text string corresponds to a language belonging to the respective symbol script family according to a ratio of the character count for the given symbol script family to a total character count of characters in the sequence of characters of the given text string;

for each particular symbol script family having a non-zero likelihood, computing a respective probability that each of one or more languages belonging to the particular symbol script family is the language of the text string;

for any language belonging to more than one particular symbol script family, replacing its respective probability with a sum of its respective probabilities across the more than one particular symbol script family to which it belongs; and determining the language of the text string according to a maximum of the respective probabilities.

11. The method of claim 10, wherein categorizing the characters as belonging to one of the plurality of symbol script families comprises comparing each character's respective value of the character encoding scheme with predetermined value ranges of the character encoding scheme respectively associated with the symbol script families of the plurality.

12. The method of claim 11, wherein, for each particular symbol script family having a non-zero likelihood, computing the respective probability that each of the one or more languages belonging to the particular symbol script family is the language of the text string comprises:

for each particular symbol script family of all of any of the plurality that (i) has a non-zero likelihood, and (ii) has only one language belonging to it, determining that a respective first probability of the text string being in the one language is equal to the likelihood for the particular symbol script family;

wherein, for any language belonging to more than one particular symbol script family, replacing its respective probability with the sum of its respective probabilities across the more than one particular symbol script family to which it belongs comprises:

for each given symbol script family of all of any of the plurality that (i) has a non-zero likelihood, and (ii) has a multiplicity of languages belonging to it:

(a) applying a predetermined language model for the given symbol script family to the text string to determine for each respective language of the multiplicity a respective second likelihood that the text string corresponds to the respective language, and (b) multiplying each respective second likelihood by the likelihood for the given symbol script family to determine for each respective language of the multiplicity a respective second probability that text string is in the respective language; and (c) computing a respective sum of all of any second probabilities determined for the given language;

and wherein determining the language of the text string according to a maximum of the respective probabilities comprises:

if there is at least one of (i) at least one particular symbol script family, or (ii) at least one given symbol script family, then:

for each given language that is a member of at least one of (a) the at least one particular symbol script family, or (b) the at least one given symbol script family, adding a respective sum of all of any respective first probabilities to the respective sums of the second probabilities, and determining the language of the text string to be the one from among the given languages for which the sum is maximum;

and wherein the one or more processors are further configured to determine the language of text string to be unknown, if there are no particular symbol script families and no given symbol script families.

13. The method of claim 12, wherein, for any one symbol script family of the plurality to which more than one language belongs, the predetermined language model is one of:

a word model, an N-gram model for one value of N, wherein N is a positive integer, a multi-N-gram model including a hybrid of two more N-gram models, each having a different value of N, a mixed model including a word model and an N-gram model, or a mixed multi model including a word model and a hybrid of two more N-gram models, each having a different value of N.

14. The method of claim 13, wherein the word model for the one symbol script family comprises an empirically-determined probability distribution of training words over all languages belonging to the one symbol script family, and wherein applying the predetermined language model for the given symbol script family to the text string comprises:

applying the word model to each word of the text string to determine a respective score for the text string being in each language of the one symbol script family; and calculating a respective confidence of the text string being each language of the one symbol script family as the respective score normalized to a sum of all of the respective scores.

15. The method of claim 13, wherein the N-gram model for the one symbol script family comprises an empirically-determined probability distribution of training N-grams over all languages belonging to the one symbol script family, and wherein applying the predetermined language model for the given symbol script family to the text string comprises:

applying the N-gram model to each N-gram of the text string to determine a respective score for the text string being in each language of the one symbol script family; and calculating a respective confidence of the text string being each language of the one symbol script family as the respective score normalized to a sum of all of the respective scores.

16. The method of claim 12, wherein the mixed model including the word model and the N-gram model for the one symbol script family comprises:

an empirically-determined probability distribution of training words over all languages belonging to the one symbol script family, and an empirically-determined probability distribution of training N-grams over all languages belonging to the one symbol script family, and wherein applying the predetermined language model for the given symbol script family to the text string comprises:

applying the word model to each word of the text string to determine a respective word score for the text string being in each language of the one symbol script family;

applying the N-gram model to each N-gram of the text string to determine a respective N-gram score for the text string being in each language of the one symbol script family;

calculating a respective mixed score for the text string being in each language of the one symbol script family as a weighted sum of the respective word and N-gram scores normalized to a sum of weighting values, wherein the weighting values are respective weights applied to the respective word and N-gram scores in the weighted sum; and calculating a respective confidence of the text string being each language of the one symbol script family as the respective mixed score normalized to a sum of all of the respective mixed scores.

17. The method of claim 10, wherein the character encoding scheme is one of Unicode or American Standard Code for Information Interchange (ASCII).

18. The method of claim 13, wherein the plurality of symbol script families includes:

Latin, Cyrillic, Arabic, CJK, Hiragana, Kana, Katakana, Hangul, Greek, Thai, and Hebrew, wherein the languages belonging to the Latin symbol script family include: Czech, Dutch, Finnish, French, German, Hungarian, Italian, Polish, Portuguese, Spanish, English, Catalan, Danish, Indonesian, Norwegian, Swedish, Turkish, Romanian, and Vietnamese, wherein the languages belonging to the Cyrillic symbol script family include: Bulgarian, Russian, and Ukrainian, wherein the languages belonging to the Arabic symbol script family include: Arabic, and Persian, wherein the languages belonging to the CJK symbol script family include: Chinese, Japanese, and Korean, wherein the languages belonging to the Hiragana symbol script family include: Japanese, wherein the languages belonging to the Kana symbol script family include: Japanese, wherein the languages belonging to the Katakana symbol script family include: Japanese, wherein the languages belonging to the Hangul symbol script family include: Korean, wherein the languages belonging to the Greek symbol script family include: Greek, wherein the languages belonging to the Thai symbol script family include: Thai, wherein the languages belonging to the Hebrew symbol script family include: Hebrew, wherein the language model for the Latin symbol script family is a hybrid word and 5-gram model, wherein the language model for the Cyrillic symbol script family is 5-gram model, wherein the language model for the Arabic symbol script family is 3-gram model, and wherein the language model for the CJK symbol script family is hybrid 1-gram and 2-gram model.

19. An article of manufacture including a non-transitory computer-readable medium, having stored thereon program instructions that, upon execution by one or more computing devices of a system comprising persistent storage containing representations of a plurality of symbol script families, cause the system to perform operations comprising:

obtaining a text string comprising a sequence of characters, each of the characters having a respective value of a character encoding scheme;

categorizing the characters as belonging to one of the plurality of symbol script families;

determining a respective character count for each given symbol script family of the plurality according to how many characters of the sequence are categorized as belonging to the given symbol script family;

for each respective symbol script family of the plurality, calculating a likelihood that the text string corresponds to a language belonging to the respective symbol script family according to a ratio of the character count for the given symbol script family to a total character count of characters in the sequence of characters of the given text string;

for each particular symbol script family having a non-zero likelihood, computing a respective probability that each of one or more languages belonging to the particular symbol script family is the language of the text string;

for any language belonging to more than one particular symbol script family, replacing its respective probability with a sum of its respective probabilities across the more than one particular symbol script family to which it belongs; and determining the language of the text string according to a maximum of the respective probabilities.

20. The article of manufacture method of claim 19, wherein the character encoding scheme is one of Unicode or American Standard Code for Information Interchange (ASCII), wherein the plurality of symbol script families includes:

Latin, Cyrillic, Arabic, CJK, Hiragana, Kana, Katakana, Hangul, Greek, Thai, and Hebrew, wherein the languages belonging to the Latin symbol script family include: Czech, Dutch, Finnish, French, German, Hungarian, Italian, Polish, Portuguese, Spanish, English, Catalan, Danish, Indonesian, Norwegian, Swedish, Turkish, Romanian, and Vietnamese, wherein the languages belonging to the Cyrillic symbol script family include: Bulgarian, Russian, and Ukrainian, wherein the languages belonging to the Arabic symbol script family include: Arabic, and Persian, wherein the languages belonging to the CJK symbol script family include: Chinese, Japanese, and Korean, wherein the languages belonging to the Hiragana symbol script family include: Japanese, wherein the languages belonging to the Kana symbol script family include: Japanese, wherein the languages belonging to the Katakana symbol script family include: Japanese, wherein the languages belonging to the Hangul symbol script family include: Korean, wherein the languages belonging to the Greek symbol script family include: Greek, wherein the languages belonging to the Thai symbol script family include: Thai, and wherein the languages belonging to the Hebrew symbol script family include: Hebrew.

* * * * *